(12) United States Patent
Reuhs et al.

(10) Patent No.: US 7,651,579 B1
(45) Date of Patent: Jan. 26, 2010

(54) STORAGE BAG

(75) Inventors: Rebecca S. Reuhs, Chicago, IL (US);
Bruce N. Hall, Cincinnati, OH (US);
Ronald J. Cisek, Hinsdale, IL (US)

(73) Assignee: The Glad Products Company, Oakland, CA (US)

( * ) Notice: Subject to any disclaimer, the term of this patent is extended or adjusted under 35 U.S.C. 154(b) by 652 days.

(21) Appl. No.: 11/341,077

(22) Filed: Jan. 27, 2006

(51) Int. Cl.
*B32B 37/00* (2006.01)
(52) U.S. Cl. .......... 156/244.11; 156/252; 156/308.4
(58) Field of Classification Search .......... 156/242, 156/244.11, 250, 252, 290, 292, 308.2, 308.4
See application file for complete search history.

(56) References Cited

U.S. PATENT DOCUMENTS

| | | | |
|---|---|---|---|
| 4,186,786 A | 2/1980 | Kirkpatrick | |
| 4,285,105 A | 8/1981 | Kirkpatrick | |
| 4,363,345 A | 12/1982 | Scheibner | |
| 4,561,109 A | 12/1985 | Herrington | |
| 4,941,310 A | 7/1990 | Kristen | |
| 5,055,152 A * | 10/1991 | Inagaki | 156/244.11 |
| 5,662,758 A | 9/1997 | Hamilton et al. | |
| 5,804,265 A | 9/1998 | Saad et al. | |
| 5,851,070 A | 12/1998 | Dobreski et al. | |
| 5,871,607 A | 2/1999 | Hamilton et al. | |
| 5,911,508 A | 6/1999 | Dobreski et al. | |
| 5,965,235 A | 10/1999 | McGuire et al. | |
| 6,010,244 A | 1/2000 | Dobreski et al. | |
| 6,040,024 A * | 3/2000 | Tokita et al. | 428/35.2 |
| 6,126,975 A | 10/2000 | Archibald et al. | |
| 6,193,918 B1 | 2/2001 | McGuire et al. | |
| 6,194,062 B1 | 2/2001 | Hamilton et al. | |
| 6,234,675 B1 | 5/2001 | Saad et al. | |
| 6,371,643 B2 | 4/2002 | Saad et al. | |
| 6,489,022 B1 | 12/2002 | Hamilton et al. | |
| 6,550,966 B1 | 4/2003 | Saad et al. | |
| 6,602,454 B2 | 8/2003 | McGuire et al. | |
| 2001/0048022 A1 * | 12/2001 | Zoeckler | 229/199 |
| 2003/0218274 A1 | 11/2003 | Boutilier et al. | |
| 2004/0142159 A1 | 7/2004 | Pallotta et al. | |

* cited by examiner

*Primary Examiner*—James Sells
(74) *Attorney, Agent, or Firm*—Thomas C. Feix; David Peterson

(57) ABSTRACT

The storage bag includes two sidewalls with peripheral edges and the sidewalls being attached together along at least a portion of the peripheral edges. One or more additional sidewalls may be disposed within the bag, and these additional sidewalls may be connected to form an inner bag. Any inner bag sidewalls may be laminated to the outer bag sidewalls or hang loose from the outer bag sidewalls. One or more of the sidewalls may include an adhesive for adhering to an opposing sidewall or item in the bag, a thin perforated layer disposed over an adhesive, a line of perforations for tearing, and/or one or more perforations for venting. Furthermore, processes for manufacturing a storage bag are disclosed.

6 Claims, 28 Drawing Sheets

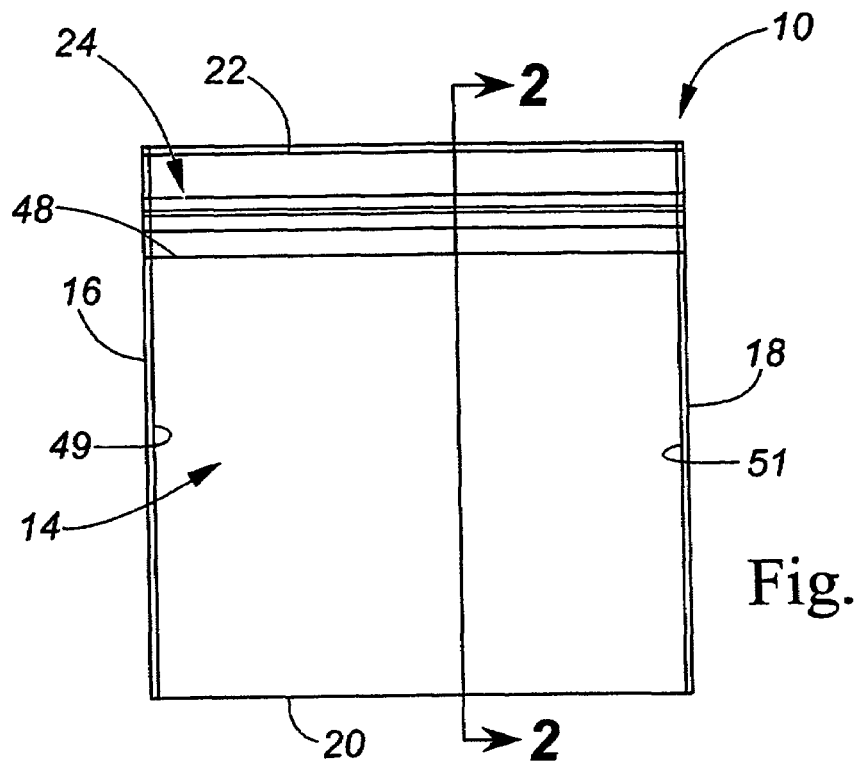
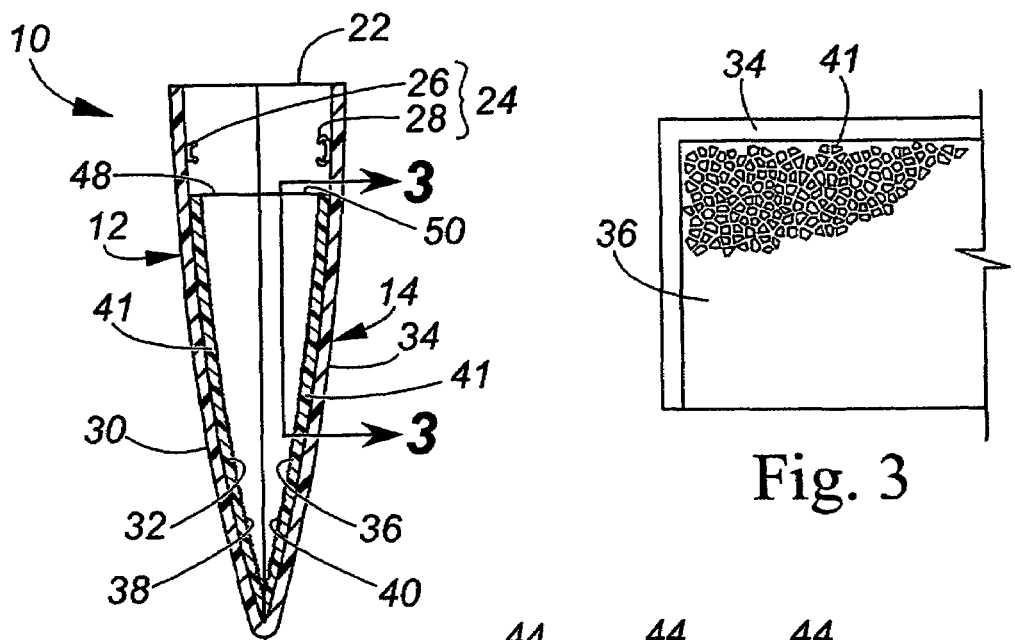
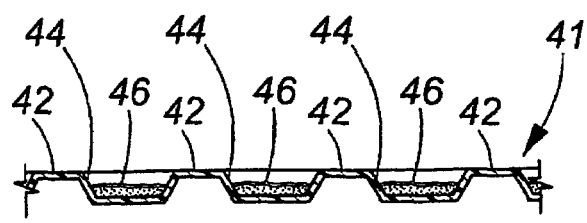

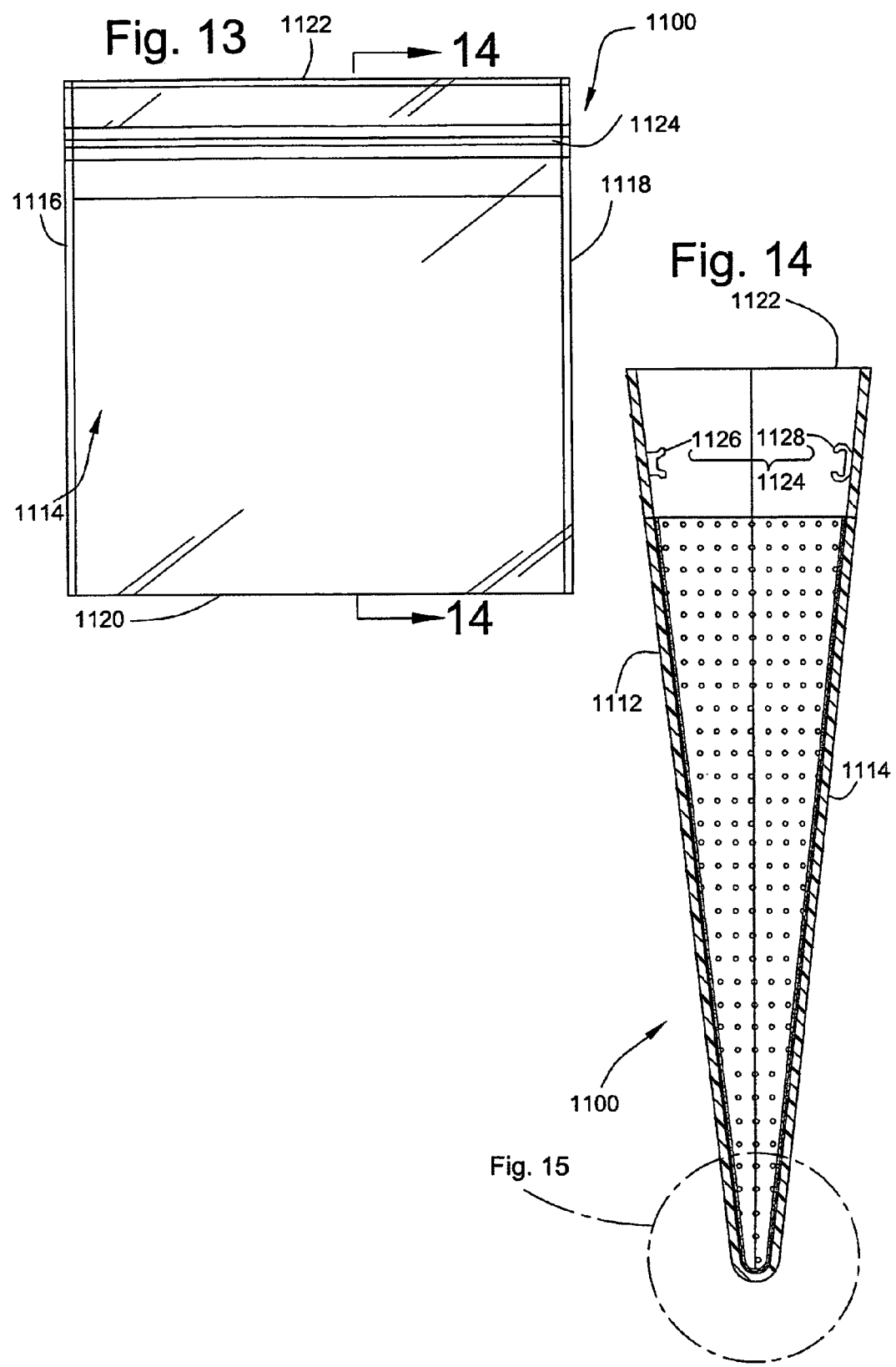

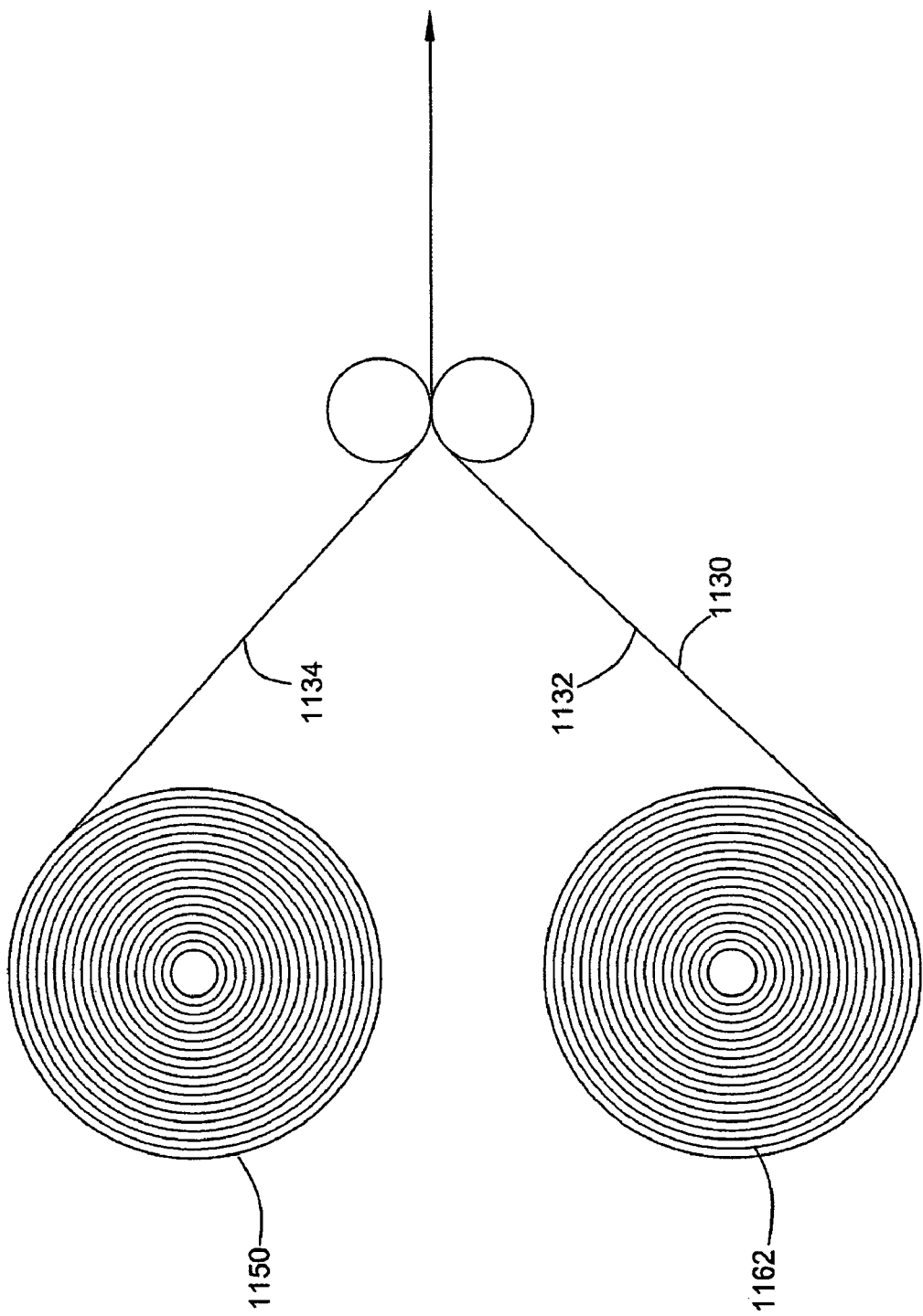

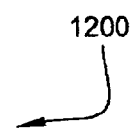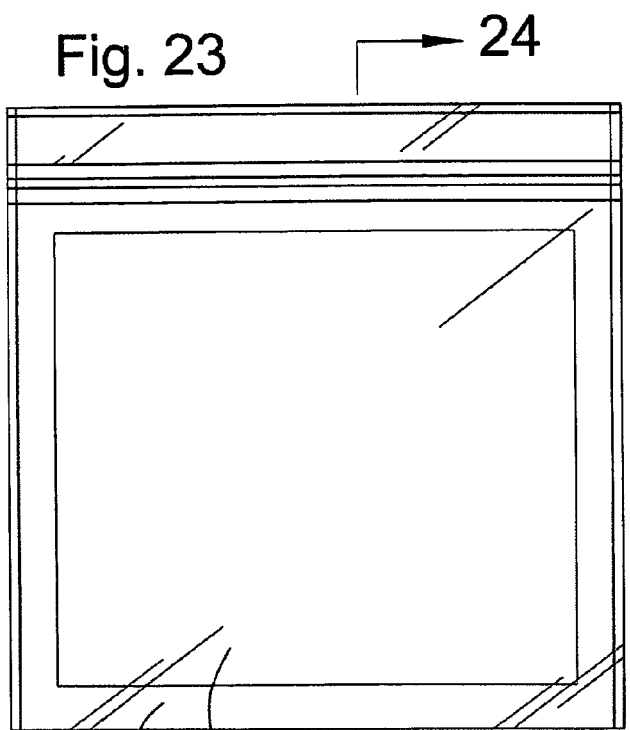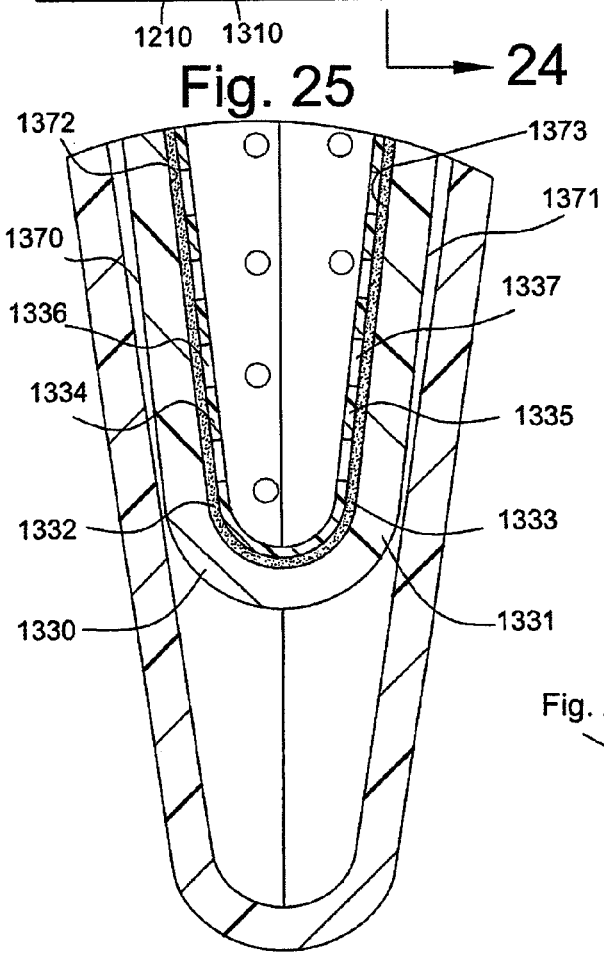

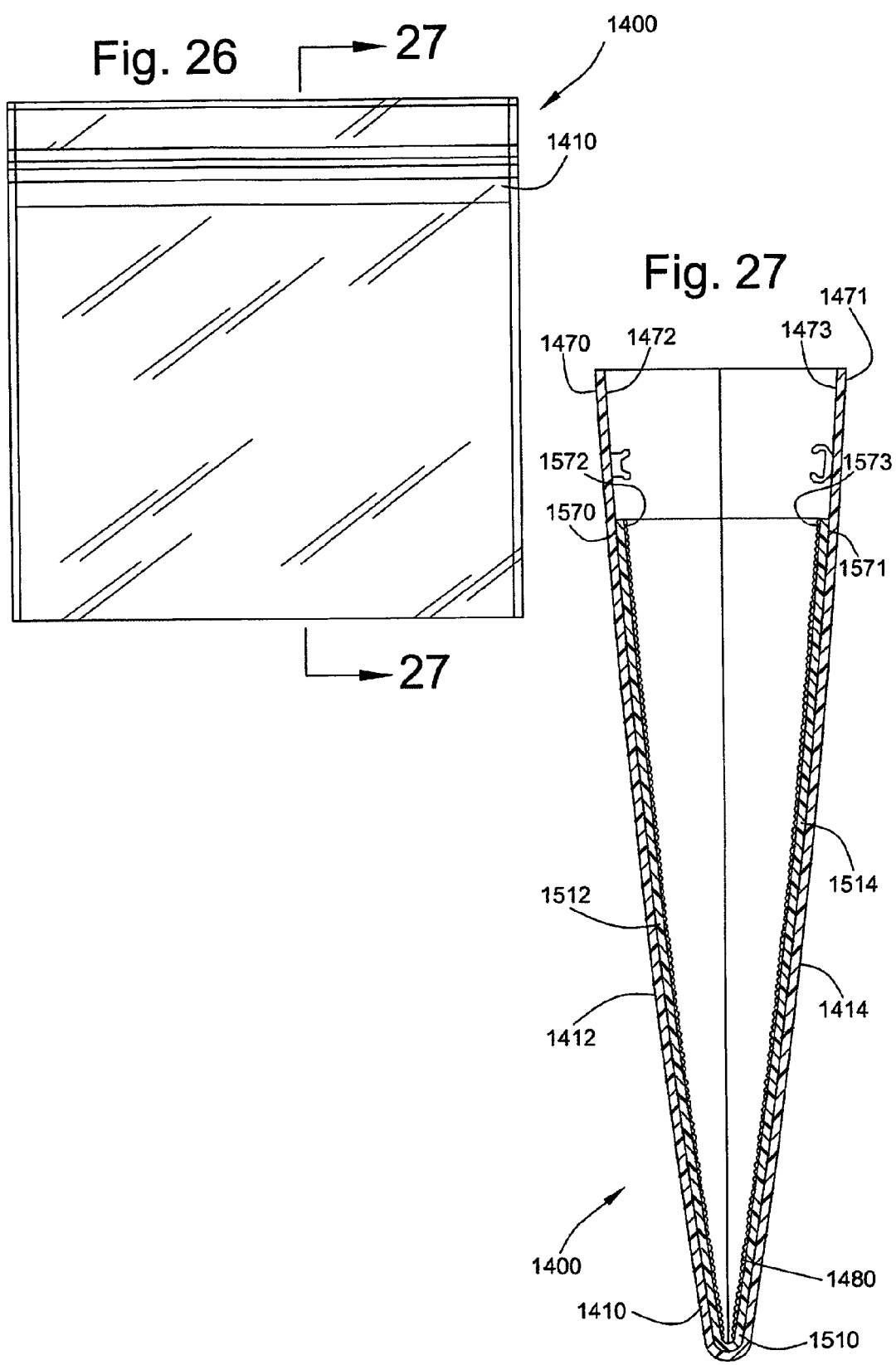

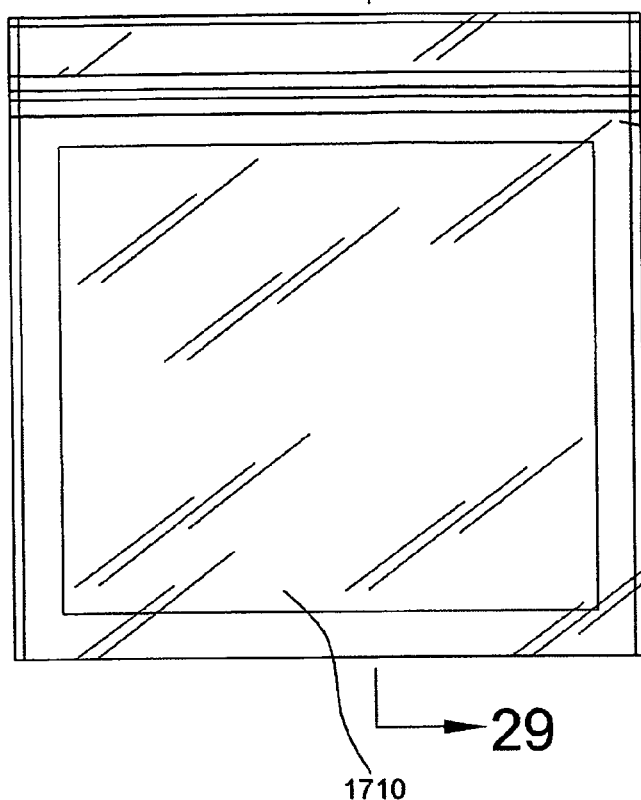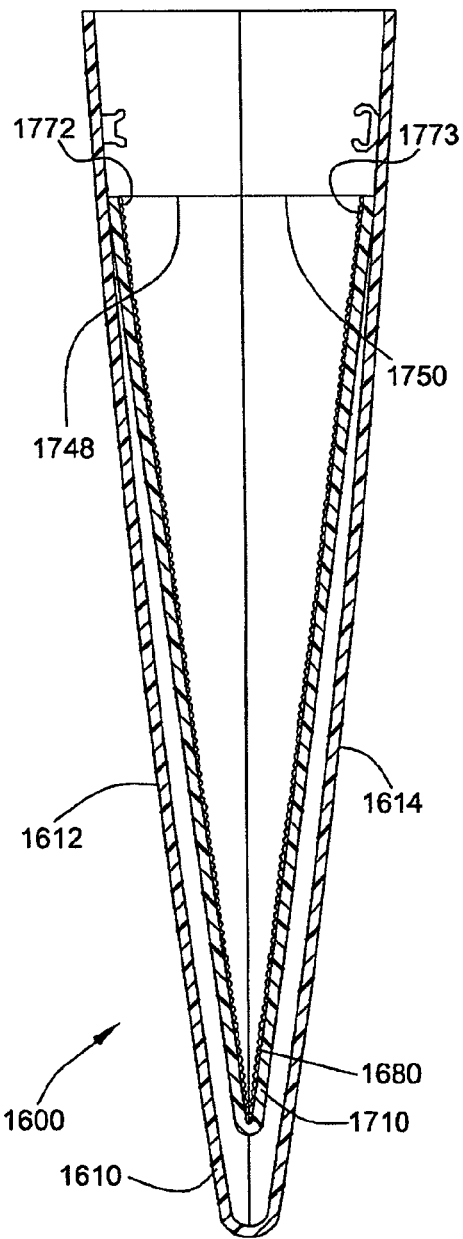

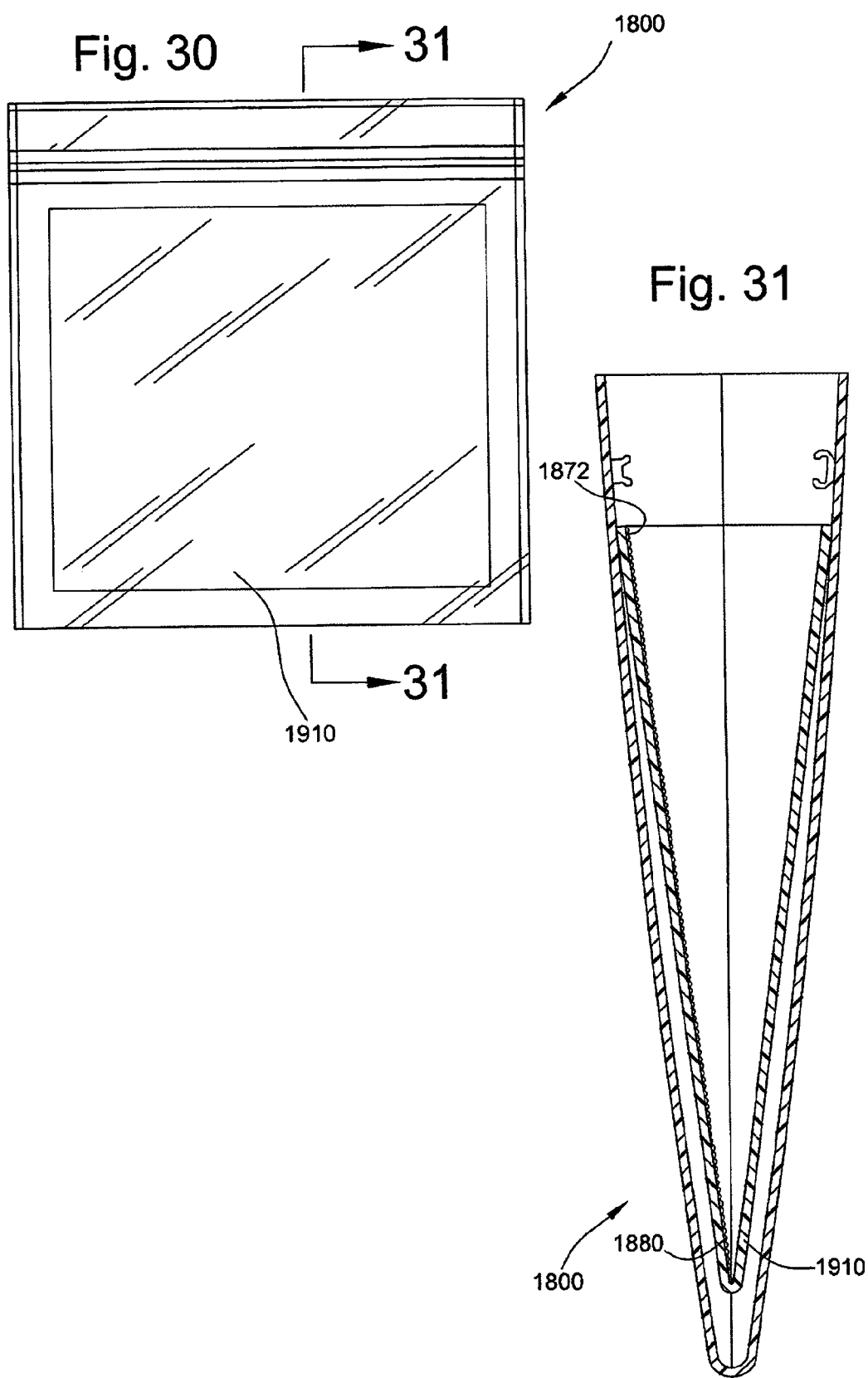

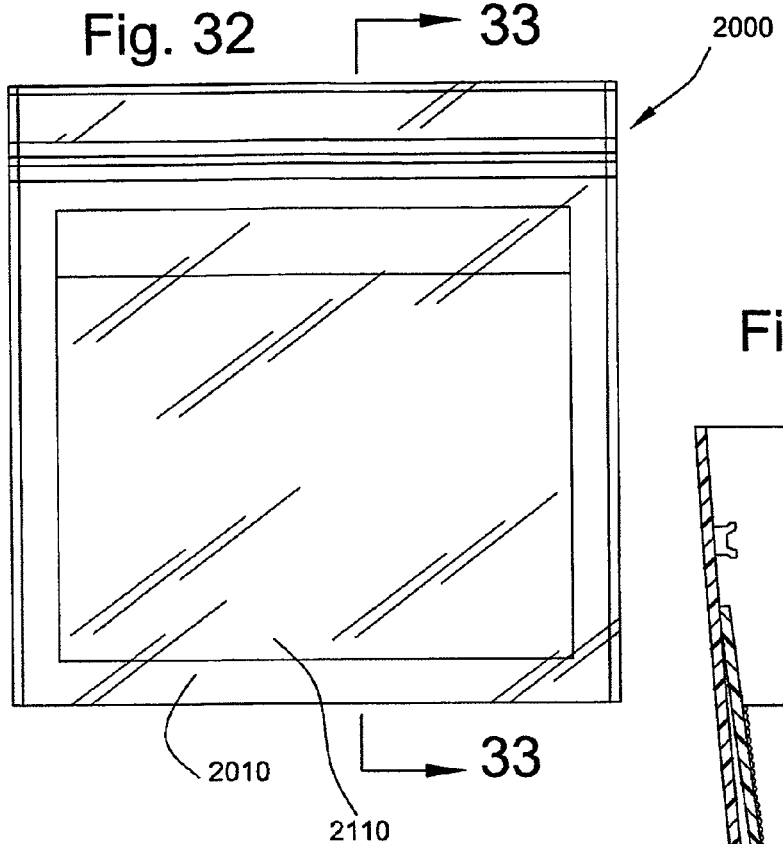
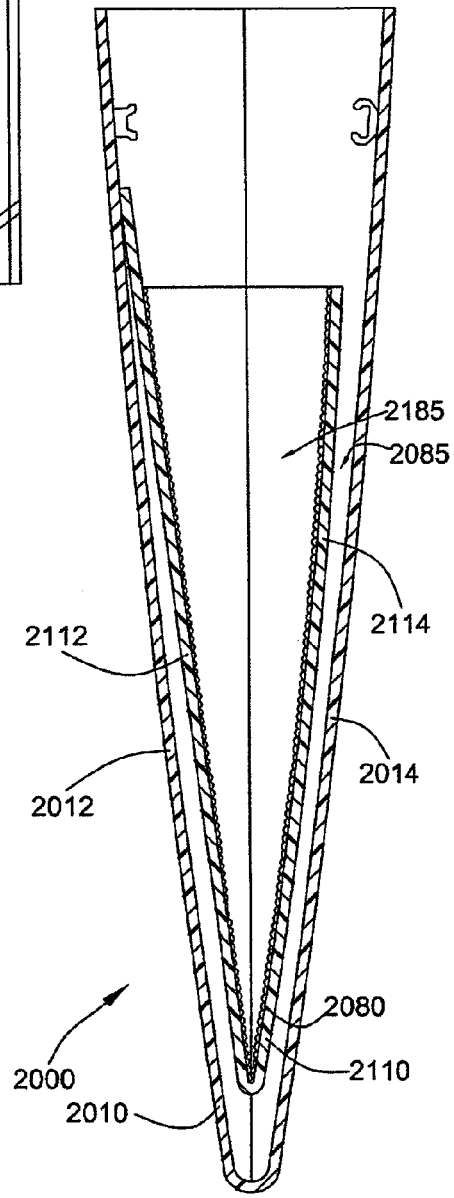

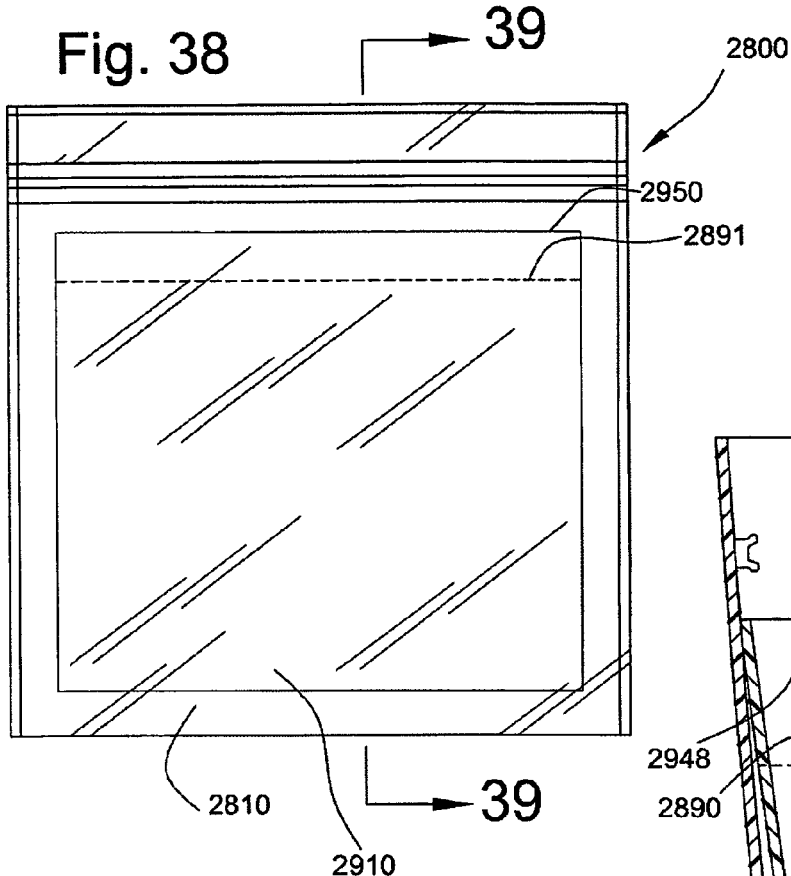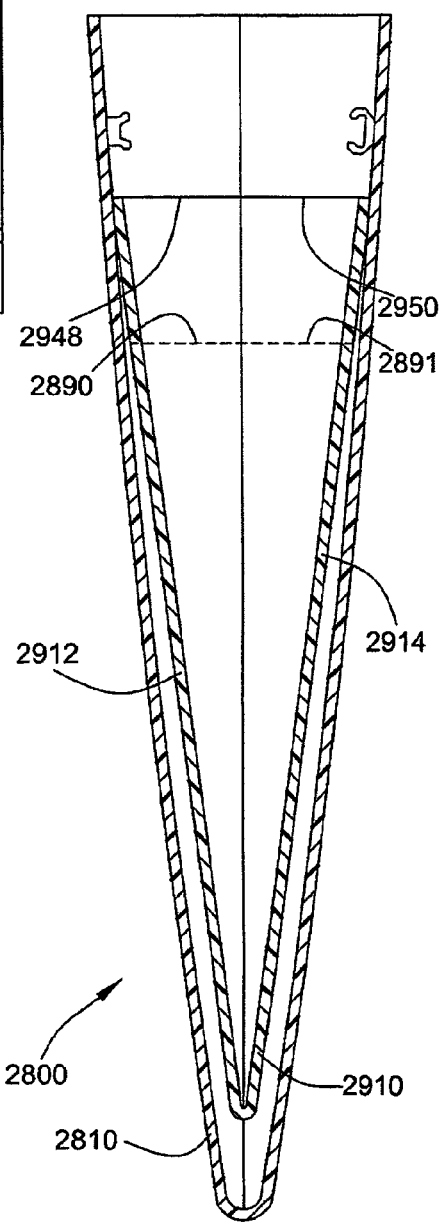

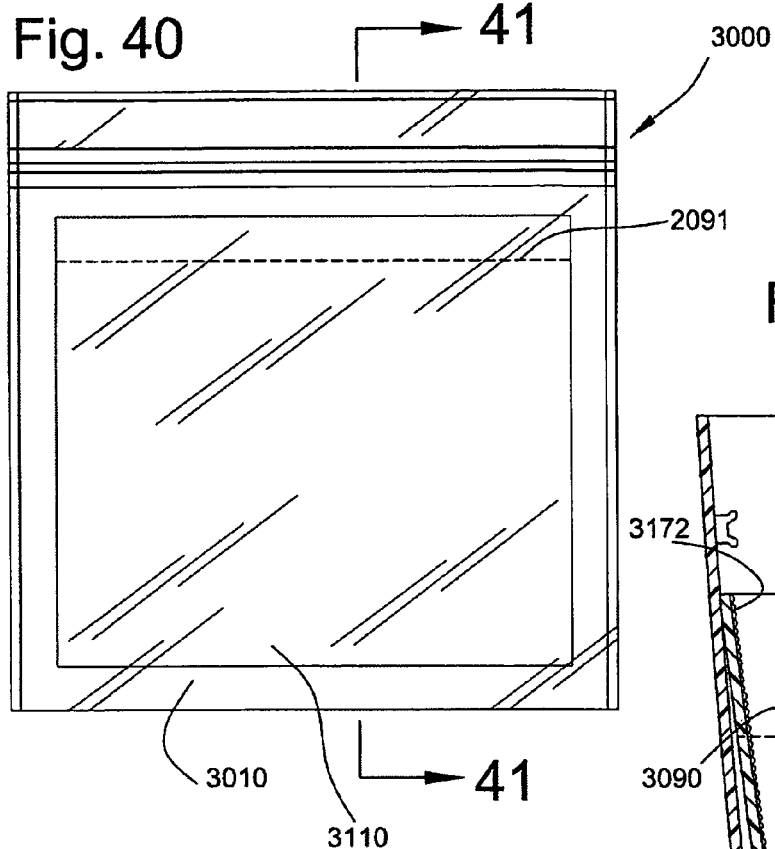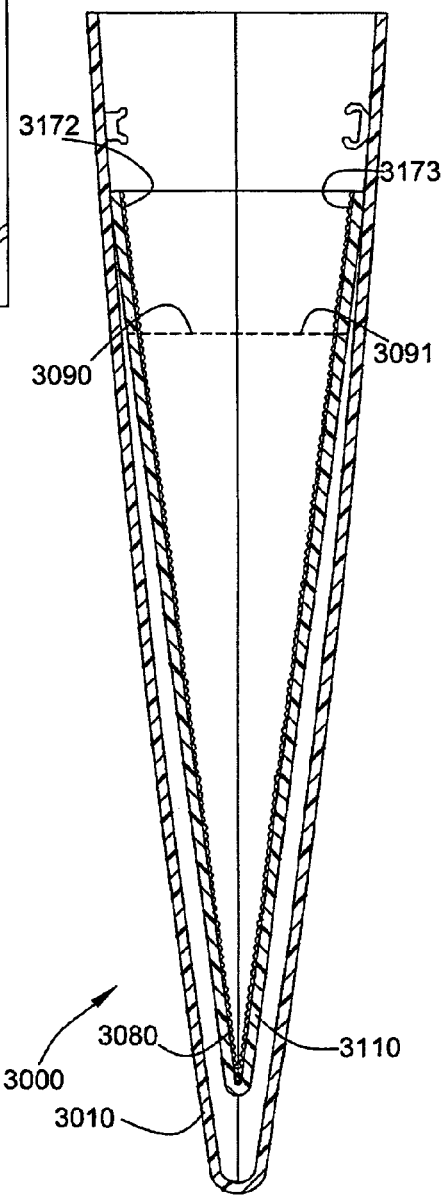

STORAGE BAG

FIELD OF THE INVENTION

The present invention relates to storage bags suitable for use in the containment and protection of various items, such as food items. The present invention further relates to processes for forming a material suitable for constructing a storage bag of the present invention.

BACKGROUND OF THE INVENTION

The use of storage bags for containing items to be stored, such as food items, is generally known in the art. Such storage bags include freezer bags provided in various sizes for containing food items, such as meats, in a sealed manner in a freezer environment. It is desirable for such bags to have a reclosable or reusable closure effective to provide an airtight seal. Further, in use of such storage bags, it is desirable to eliminate any air contained within the storage bag and seal opposing sides of the bag to prevent reentry of air in order to minimize contact of the bag contents with air and reduce the possibility of freezer burn, such as may occur as a result of dehydration of a food item stored in a low humidity, freezer environment. Similarly, for other items not stored in a freezer environment, it is beneficial for the preservation of the items to minimize air contact when stored within a storage bag.

There continues to be need for a storage bag suitable for use in containing stored items in a freezer or other environment, and in which an item may be sealably retained in the bag and air contact with the stored item may be minimized.

BRIEF SUMMARY OF THE INVENTION

The invention provides a storage bag having a first sidewall, a second sidewall, and a third sidewall. The first sidewall has a first interior surface and the second sidewall has a second interior surface. The first and second sidewalls are attached to one another along at least a portion of a periphery of the first and second sidewalls. The third sidewall has a third interior surface that is attached to at least one of the first and second interior surfaces. An adhesive is disposed on a portion of at least one of the first, second, and third interior surfaces.

The invention further provides a storage bag further comprising one or more perforations in at least one of the first sidewall and the second sidewall.

The invention further provides a storage bag having a film disposed over the adhesive, and the film having a plurality of perforations.

The invention further provides a storage bag having one or more perforations in the third sidewall.

The invention further provides a storage bag wherein the third sidewall has a line of tear perforations to permit at least a portion of the third sidewall to be separated from the at least one of the first and second interior surfaces by tearing along the line of tear perforations.

The invention further provides a storage bag comprising a fourth sidewall having a fourth interior surface.

The invention further provides a storage bag wherein the fourth sidewall is connected to the third sidewall, and the fourth sidewall is attached to one of the other first and second interior surfaces that is not directly connected to the third sidewall such that the third and fourth sidewall form an inner bag.

BRIEF DESCRIPTION OF THE DRAWINGS

FIG. 1 is a front elevational view of a reclosable storage bag in accordance with the teachings of the present invention;

FIG. 2 is a cross-sectional elevational view taken along line 2-2 in FIG. 1;

FIG. 3 is an enlarged view of a section taken at line 3-3 in FIG. 2, illustrating an inner layer of the storage bag of FIG. 1;

FIG. 4 is an enlarged elevational section view of the inner layer illustrated in FIG. 3;

FIG. 13 is a front elevational view of another embodiment of a storage bag.

FIG. 14 is a cross-sectional elevational view taken along line 14-14 in FIG. 13.

FIG. 22 is a diagram illustrating another process for forming the sidewall of FIG. 18.

FIG. 23 is a front elevational view of another embodiment of a storage bag.

FIG. 24 is a cross-sectional elevational view taken along line 24-24 in FIG. 23.

FIG. 25 is a fragmentary cross-sectional elevational view of the storage bag of FIGS. 23 and 24.

FIG. 26 is a front elevational view of another embodiment of a storage bag.

FIG. 27 is a cross-sectional elevational view taken along line 27-27 in FIG. 26.

FIG. 28 is a front elevational view of another embodiment of a storage bag.

FIG. 29 is a cross-sectional elevational view taken along line 29-29 in FIG. 28.

FIG. 30 is a front elevational view of another embodiment of a storage bag.

FIG. 31 is a cross-sectional elevational view taken along line 31-31 in FIG. 30.

FIG. 32 is a front elevational view of another embodiment of a storage bag.

FIG. 33 is a cross-sectional elevational view taken along line 33-33 in FIG. 32.

FIG. 38 is a front elevational view of another embodiment of a storage bag.

FIG. 39 is a cross-sectional elevational view taken along line 39-39 of the storage bag of FIG. 38.

FIG. 40 is a front elevational view of another embodiment of a storage bag.

FIG. 41 is a cross-sectional elevational view taken along line 41-41 of the storage bag of FIG. 40.

DETAILED DESCRIPTION OF THE INVENTION

Figure 5:
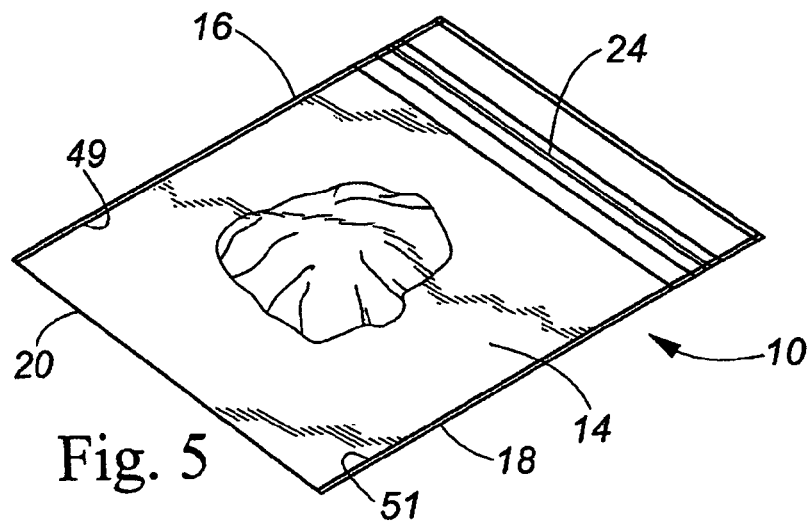
FIG. 5 is a perspective view of the storage bag of FIG. 1 containing an item sealed within the storage bag.

Referring to FIGS. 1 and 2, a reclosable storage bag 10 in accordance with the teachings of the present invention is shown. The storage bag 10 generally includes two opposing sidewalls 12, 14 that are attached together along a portion of a periphery of the sidewalls 12, 14, such as along longitudinal edge seams 16, 18 and along a laterally extending bottom edge 20. In the illustrated storage bag 10, the longitudinal edge seams 16, 18 may be formed by sonic welding, heat sealing, an adhesive or other conventional attachment means along the edges of the material forming the sidewalls 12, 14, and the bottom edge 20 may be defined by a fold in the material forming the sidewalls 12, 14. Further, the bottom edge 20 may also include an edge seam formed in a manner similar to that of the longitudinal edge seams 16, 18.

An upper end of the bag 10 includes an open mouth 22 for insertion of articles into the interior of the bag 10. A reusable closure 24 comprising complementary mating elements 26, 28 is located on the interior of the sidewalls 12, 14 at the mouth 22 for reclosably sealing the mouth 22 of the bag 10. For example, the reusable closure may comprise an interlocking seal type closure, and which may or may not include a slider for manipulating opening and closing of the bag 10. The present invention is not limited to the illustrated reusable closure, and examples of reusable closures that may be employed, and information on their manufacture, is described in U.S. Pat. Nos. 4,186,786; 4,285,105; 4,363,345; 4,561,109; 5,804,265 and 5,851,070. Other closures may also be provided within the scope of the described invention.

Referring to FIG. 2, each of the sidewalls 12, 14 forming the bag 10 comprise plural layers, including a first layer 30 and a second layer 32 for the sidewall 12 and a first layer 34 and a second layer 36 for the sidewall 14. The first layers 30, 34 define an outer film surface for the bag 10, and the second layers 32, 36 define an inner, article engaging film for the bag 10. The second or inner layers 32, 36 comprise a composite material having a characteristic that enables inner facing surfaces 38, 40 of the inner layers 32, 36 to adhere to each other. Alternatively, one of the second layers 32, 36 may be omitted so that the remaining second layer will adhere to the opposing non-adhesive inside surface of the first layer. By way of example, the inner layers 32, 36 are formed of a pressure sensitive composite material 41 (FIG. 3) exhibiting a characteristic of releasably adhering to an adjacent contacting material surface upon application of a pressure, while not adhering to the adjacent contacting surface in the absence of application of the pressure.

Such composite materials are known in the art and include films formed with a plurality of protrusions 42 and valleys 44 (FIG. 4), such as may be formed by an embossing operation, where the valleys 44 on an adhesive side of the film are at least partially filled with a pressure sensitive adhesive 46. The adhesive 46 is held out of engagement with an adjacent surface by the protrusions 42 until a sufficient pressure is applied to the side of the film opposite the adhesive side causing at least some of the protrusions 42 to collapse and allow contact of the adhesive with the adjacent surface, resulting in adhesion between the composite material and the adjacent surface.

As described, the currently preferred embodiment of the composite material can utilize either raised protrusions, or raised land areas surrounding dimples, to prevent premature sticking of the adhesive to an adjacent surface. However, other forms of composite materials that include a non-adhesive material to control the tack of the adhesive and prevent the adhesive from attachment to an adjacent surface prior to the application of pressure may also be used in accordance with the present invention. Exemplary materials include, without limitation, release liners such as silicone coated paper or coatings, inks, varnish, particles (talc, calcium carbonate, starch, wax beads and the like), nonwovens, scrim and fibers which are mixed with or coated upon the adhesive. The adhesive and/or non-adhesive coatings can either be continuous or non-continuous (discrete). Solid, pressure activated adhesives can also be used including, without limitation, microencapsulated adhesives that are coated continuously or in discrete patterns onto a film. In the case of microencapsulated adhesives and the like, pressure is applied to rupture the surface of the microcapsules to bring the adhesive into contact with an adjacent surface. Additional details and further examples of such composite materials, and information on their manufacture, may be found in U.S. Pat. Nos. 5,662,758; 6,489,022; 5,871,607; 6,194,062; 5,965,235; 6,193,918; 6,602,454; U.S. Patent Application Publications 2003/0218274 A1 and 2004/0142159 A1. However, as would be known to one of skill in the art, other forms of composite materials having an adhesive disposed thereon could be used in accordance with the present invention including any material having an adhesive disposed continuously or discontinuously thereon.

The complementary elements 26, 28 of the reusable closure 24 are located on opposing inner faces of the outer layers 30, 34 of the sidewalls 12, 14, and the composite material 41 of the inner layers 32, 36 defines upper edges 48, 50 which are illustrated located in spaced relation from the reusable closure elements 26, 28. The outer layers 30, 34 additionally include opposing longitudinal edges which are defined by the longitudinal seam edges 16, 18, and the inner layers 32, 36 include longitudinal edges located at 49, 51 and located within a seam area defined by the longitudinal seam edges 16, 18.

During a use of the storage bag 10, the sidewalls 12, 14 are pressed together in areas surrounding the contents of the storage bag 10 (see FIG. 5) to thereby expel air from the storage bag 10 and bring the inner facing surfaces 38, 40 of the inner layers 32, 36 into engagement with each other. The pressure applied by pressing the sidewalls 12, 14 together causes the adhesive on each facing surface 38, 40 to move into engagement with and adhere to the opposing facing surface 40, 38, thereby retaining the inner layers 32, 36 in engagement with each other and preventing air from reentering the adhered areas.

In one embodiment, the outer layers 30, 34 may comprise films formed of low-density polyethylene (LDPE) having a thickness in the range of approximately 0.1-10.0 mils (0.0254-0.254 mm), and preferably in the range of approximately 1.5-2.0 mils (0.0381-0.0508 mm). The inner layers 32, 36 may comprise films of high density polyethylene (HDPE) having an unembossed thickness in the range of approximately 0.25 to 2.0 mils (0.00635-0.0508 mm) and an embossed caliper of approximately 4.0 mils (0.1016 mm). Thus, the LDPE material of the outer layers 30, 34 provides an outer storage bag surface visually similar to known commercially available storage bags. However, it should be noted that other materials and film thicknesses can be used for either of the layers of the sidewalls 12, 14.

Examples of materials that may be used for the outer layers 30, 34 include, without limitation, thermoplastic materials or a blend of thermoplastic materials. The films may be made by a conventional cast or blown film process. Useful thermoplastics include, without limitation, polyolefins such as high density polyethylene (HDPE), low density polyethylene (LDPE), linear low density polyethylene (LLDPE), and polypropylene (PP); thermoplastic elastomers such as styrenic block copolymers, polyolefin blends, elastomeric alloys, thermoplastic polyurethanes, thermoplastic copolyesters and thermoplastic polyamides; polymers and copolymers of polyvinyl chloride (PVC), polyvinylidene chloride (PVDC), saran polymers, ethylene vinyl acetate (EVA) copolymers, cellulose acetates, polyethylene terephthalate (PET), ionomer (Surlyn®), polystyrene, polycarbonates, styrene acrylonitrile, aromatic polyesters, linear polyesters, nylon, thermoplastic polyvinyl alcohols; foils and metalized films.

Examples of materials that may be used to form the composite material 41 for the inner layers 32, 36 include, without limitation, metal foils, such as aluminum foil, wax paper or grease proof paper, polymeric films, nonwoven webs, fabrics, paper and combinations thereof. Some non-limiting examples of polymeric films include, polyolefin films such as polyethylene including high density, linear low density, or low density; ethylene copolymers, such as ethylene vinyl acetate (EVA) copolymers or ethylene methyl acrylate (EMA) copolymer, polyethylene terephthalate (PET), polyethylene terephthalate glycol (PETG) copolymer; polypropylenes, polyethylene-propylene copolymers; polymers and copolymers of polyvinyl chloride (PVC), polyvinylidene chloride (PVDC); polystyrene; nylon, and other polymeric films with similar properties.

The combination of outer layers 30, 34 surrounding the inner layers 32, 36 provides a double-walled construction for the storage bag 10 in which the outer layers 30, 34 form an outer bag providing a first barrier or seal for the contents of the storage bag 10 when the reusable closure 24 is closed, and the inner layers 32, 36 provide a second barrier or seal to prevent or minimize contact of air with the contents of the storage bag 10 when the inner layers 32, 36 are pressed together.

The inner layers 32, 36 of the storage bag 10 are attached to the adjacent outer layers 30, 34 across substantially the entire surface area of the inner layers 32, 36, such as may be provided by combining the composite material 41 with the film material forming the outer layers 30, 34 during extrusion and formation of the film material for the outer layers 30, 34, as is described further below. Alternatively the inner layers 32, 36 and outer layers 30, 34 may be adhered to each other by an adhesive, by static combining, or by other known means for joining two material layers.

Figure 6:
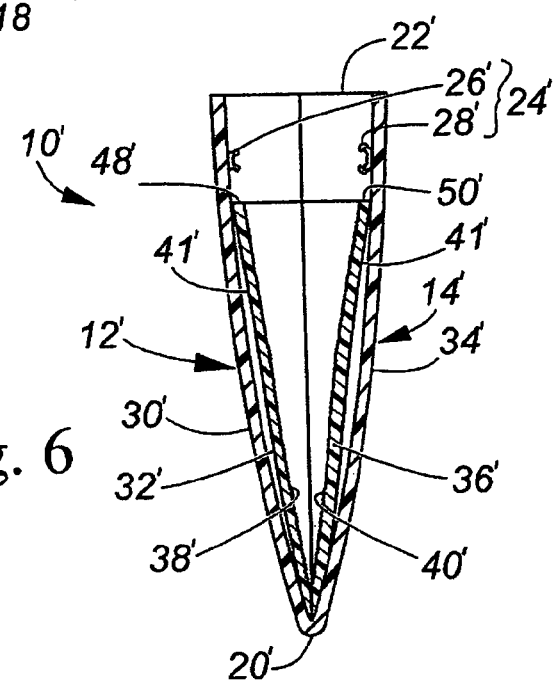
FIG. 6 is cross-sectional elevational view of an alternative configuration of the storage bag of FIGS. 1 and 2.

Referring to FIG. 6, an alternative configuration for the storage bag 10 is illustrated, identified by reference numeral 10', and in which elements corresponding to the previous configuration are identified with the same reference numerals primed. As with the previous configuration of storage bag 10, the storage bag 10' comprises two opposing sidewalls 12', 14', each sidewall 12', 14' comprising plural layers, including a first layer 30' and a second layer 32' for the sidewall 12' and a first layer 34' and second layer 36' for the opposing sidewall 14'.

The inner layers 32', 36' are connected to each other and to the outer layers 30', 34' along the longitudinal seams 16', 18' (FIG. 7), and are alternatively further joined at an edge seam along bottom edge 20' formed in a manner similar to the that of the longitudinal seams 16', 18'. Further, lateral seams are provided at the upper edges 48', 50' between the inner layers 32', 36' and the outer layers 30', 34'.

The inner layers 32', 36' may comprise a composite material where the inner faces 38', 40' of the inner layers 32', 36' may include a pressure sensitive composite material 41 of the same type described for the previous configuration of storage bag 10.

As seen in FIG. 6, the inner layers 32', 36' are substantially unattached to the outer layers 30', 34' in the area between the longitudinal seams 16', 18' and between the upper edges 48', 50' and the bottom edge 20'. Thus, the inner layers 32', 36' may move independently of the outer layers 30', 34' for draping and closely conforming to the contents of the storage bag 10' to thereby facilitate elimination of air contact with the contents. Accordingly, the described storage bag 10' provides a combined function of protection and ease of use of a storage bag with the conformability provided by the pressure sensitive composite material 41.

Figure 7:
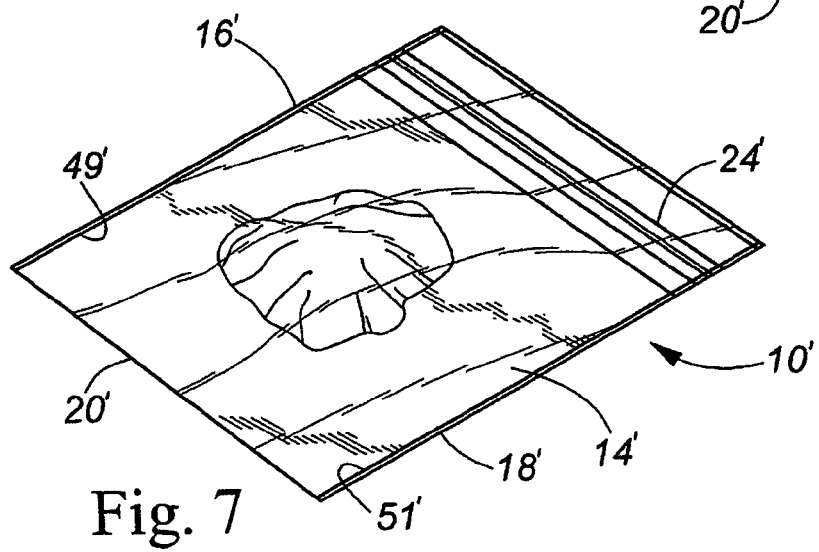
FIG. 7 is a perspective view of the storage bag of FIG. 6 containing an item sealed within the storage bag.

The storage bag 10' may be used in a manner similar to that described for the storage bag 10, where a user may apply pressure to the sidewalls 12', 14' of the bag 10' to cause the inner faces 38', 40' of the inner layers 32', 36' to adhere to each other and thereby eliminate or minimize air contact with the contents of the bag 10', as is illustrated in FIG. 7. The material of the inner layers 32, 36 provides drape or conformability characteristics which permit the inner layers 32, 36 to act as a wrap which closely conforms to the contours of the storage bag contents to minimize air contact with the contents.

Figure 8:
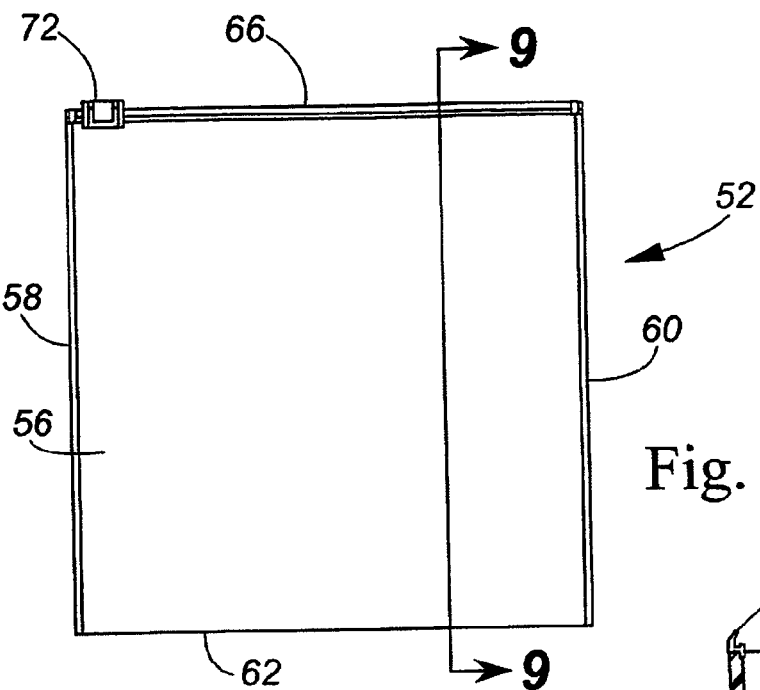
FIG. 8 is a front elevational view of an alternative embodiment of the reclosable storage bag in accordance with the teachings of the present invention.
Figure 9:
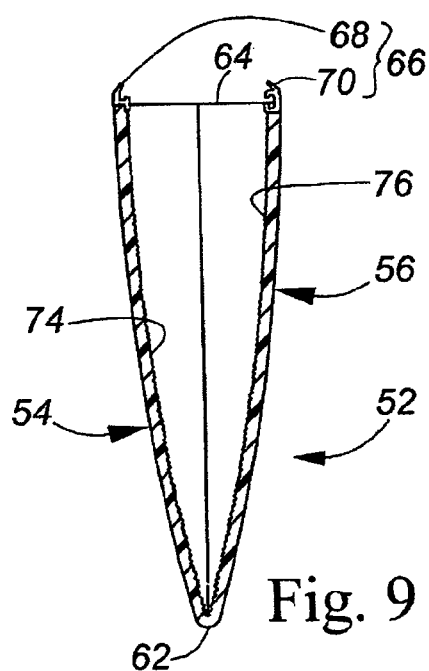
FIG. 9 is a cross-sectional elevational view taken along line 9-9 in FIG. 8.

Referring to FIGS. 8 and 9, an alternative embodiment for a storage bag 52 in accordance with the teachings of the present invention is shown. The storage bag 52 includes two opposing sidewalls 54, 56 that are attached together along a portion of a periphery of the sidewalls 54, 56, such as along longitudinal edge seams 58, 60 and along a laterally extending bottom edge 62. The longitudinal edge seams 58, 60 may be formed by sonic welding, heat sealing, an adhesive or other conventional attachment means along the edges of the material forming the sidewalls 54, 56, and the bottom edge 62 may be defined by a fold in the material forming the sidewalls 54, 56. Further, the bottom edge 62 may alternatively include an edge seam formed in a manner similar to that of the longitudinal edge seams 58, 60.

An upper end of the storage bag 52 includes an open mouth 64 for insertion of articles into the interior of the storage bag 52. A reusable closure 66 comprising complementary interlocking mating elements 68, 70 is located on the sidewalls 54, 56 at the mouth 64 for reclosably sealing the mouth 64 of the storage bag 52. In the illustrated example, the reusable closure 66 comprises a slider 72 for manipulating the complementary interlocking mating elements 68, 70 into closed and open positions. However, it should be understood that an interlocking seal type closure, such as is illustrated in FIGS. 1 and 2, or any other reclosable closure, for example as described in the above-referenced patents relating to closure devices, may be provided.

As shown in FIG. 9, the sidewalls 54, 56 each comprise a film layer formed of a composite material having a characteristic that enables inner facing surfaces 74, 76 of the respective sidewalls 54, 56 to releasably adhere to each other. By way of example, the sidewalls 54, 56 are formed of a pressure sensitive composite material exhibiting the characteristic of releasably adhering to an adjacent contacting material surface upon application of pressure, while not adhering to the adjacent contacting surface in the absence of application of the pressure, such as a composite material constructed in accordance with the above-referenced teachings relating to the composite material 41, described for the inner layers of the storage bags 10, 10'.

Alternatively, one of the sidewalls 54, 56 may be formed of a pressure sensitive composite material, such as a composite material constructed in accordance the above-referenced teachings relating to composite material 41, and the opposing sidewall 54, 56 may be formed of a non-adhesive surface, such as a smooth material surface, where the one sidewall 54, 56 will adhere to the opposing non-adhesive surface to form a conforming seal around the contents of the storage bag 52. Accordingly, the described storage bag 52 provides drape and conformability characteristics around the contents of the storage bag 52 to substantially isolate the contents from air, while also providing the ease of use of a storage bag construction including a reusable closure 66 to seal the storage bag mouth 64.

It should be noted that the material forming the sidewalls 54, 56 of the storage bag 52 comprises an HDPE film, although other film materials providing the same composite material characteristics as those associated with the pressure sensitive composite material 41 may also be used. For example, the materials described above for the composite material of the inner layers 32, 36 may be provided for the sidewalls 54, 56.

Figure 10:
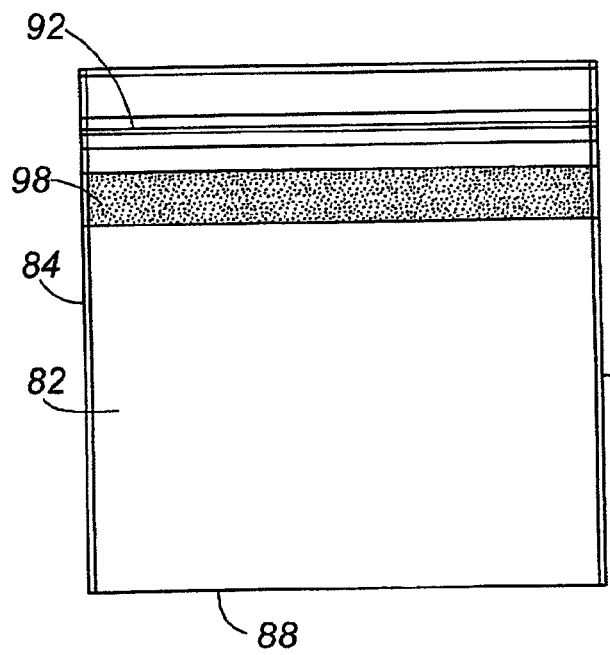
FIG. 10 is a front elevational view of a further embodiment of the reclosable storage bag in accordance with the teachings of the present invention.
Figure 11:
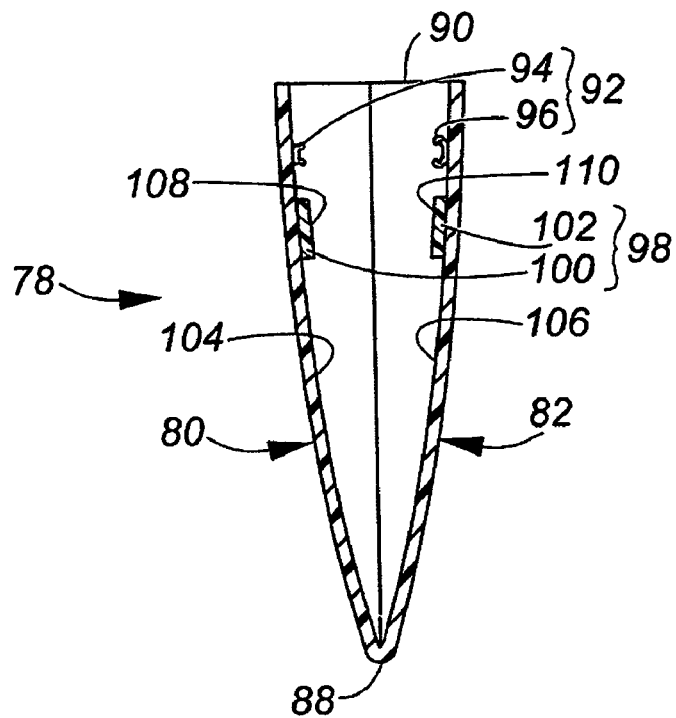
FIG. 11 is a cross-sectional elevational view taken along line 11-11 in FIG. 10.

Referring to FIGS. 10 and 11, an alternative embodiment for a storage bag 78 in accordance with the teachings of the present invention is shown. The storage bag 78 includes two opposing sidewalls 80, 82 that are attached together along a portion of a periphery of the sidewalls 80, 82, such as along longitudinal edge seams 84, 86 and along a laterally extending bottom edge 88. The longitudinal edge seams 84, 86 may be formed by sonic welding, heat sealing, an adhesive or other conventional attachment means along the edges of the material forming the sidewalls 80, 82, and the bottom edge 88 may be defined by a fold in the material forming the sidewalls 80, 82. Further, the bottom edge 88 may alternatively include an edge seam formed in a manner similar to that of the longitudinal edge seams 84, 86.

An upper end of the storage bag 78 includes an open mouth 90 for insertion of articles into the interior of the storage bag 78. A reusable closure 92 comprising complementary mating elements 94, 96 is attached to the sidewalls 80, 82 at the mouth 90 for reclosably sealing the mouth 90 of the storage bag 78. In the illustrated example, the reusable closure 92 comprises an interlocking seal type closure. However, it should be understood that a slider zipper seal type closure, such as is illustrated in FIGS. 8 and 9, or any other reusable closure, for example as described in the above-referenced patents relating to closure devices, may be provided.

The storage bag 78 includes a strip-like secondary seal 98 located in spaced relation to the reusable closure 92. The secondary seal 98 comprises respective secondary seal elements 100, 102 positioned on inner facing surfaces 104, 106 of the sidewalls 80, 82, located just below the complementary elements 94, 96. The illustrated secondary seal elements 100, 102 comprise a composite material having a characteristic that enables inner faces 108, 110 of the secondary seal elements 100, 102 to releasably adhere to each other. For example, a composite material having the characteristic of adhering to an adjacent contacting material surface upon application of a pressure, while not adhering to the adjacent contacting surface in the absence of application of pressure, may be provided for the secondary sealing elements 100, 102, such as a composite material constructed in accordance with the above-referenced teachings relating to the composite material 41. Of course, only one of the secondary seal elements 100, 102 could also be used to form the secondary seal 98. Further, secondary seal elements 100, 102 can be provided individually as continuous and/or discontinuous elements and in combination provide a continuous or discontinuous secondary seal 98 as could be recognized by one of ordinary skill in the art.

The sidewalls 80, 82 of the storage bag 78 may be formed of a LDPE film, or any of the films described herein, with reference to the outer walls 30, 34 of the storage bag 10. The secondary seal elements 100, 102 may be formed of a HDPE film or any of the films describe with reference to the composite material 41 forming the inner walls 32, 36 of the storage bag 10.

The secondary seal 98 preferably provides a visually recognizable seal separate and distinct from the reusable closure 92. Alternatively, the secondary seal 98 may be provided within the same area as the reusable closure 92.

The storage bag 78 provides a double-seal against entry of air to the interior of the storage bag 78, as well as provides a double-seal against odors entering or leaving the storage bag 78. The reusable closure 92 and the secondary seal element 98 of the double-seal construction further provides an additional closure element to secure the contents of the storage bag 78 should one of the seals inadvertently open.

In an alternative configuration of the storage bag 78, only the composite material of the secondary seal 98 may be provided at the mouth 90 of the storage bag 78 to provide a single resealable closure element for the storage bag 78.

In other alternative configurations of the storage bag 78, the composite material secondary seal 98 may be located above the reusable closure 92; a pair of composite material secondary seals 98 may be provided, one on either side of the reusable closure 92; or a pair of composite material secondary seals 98 may be provided as first and second seals for the storage bag 78 without the reusable closure 92.

In a further alternative configuration of the storage bag 78, the secondary seal 98 may be formed of a reusable closure similar to the reusable closure 92. For example, the storage bag 78 may be formed with a slider zipper seal closure for the reusable closure 92, and the secondary seal 98 may comprise an interlocking seal closure. Alternatively, both the closure elements 92 and 98 may comprise an interlocking seal closure.

The above-described embodiments provide a bag structure for eliminating or minimizing air contact with the contents of a storage bag, which is particularly advantageous for storage bags used for freezing food articles such as meats. In addition to the above-described composite material incorporated in a bag structure, at least one of the bag walls may be provided with a passage, such as a valve passage (not shown), for permitting suction to be applied to evacuate air from the interior of the storage bag. The valve passage can be located anywhere in the bag below the interlocking closure but is preferably near the top of the bag. The film that is opposite to the valve and located in proximity to the valve passage preferentially contains no adhesive and is textured such that the film opposite to the valve does not block off the opening to the valve passage or significantly restrict the air flow through the valve passage. The valve passage may be any opening in the bag that permits the passage of air through the wall of the bag. The valve is preferably a one-way valve such that air cannot return into the bag. However, one of skill in the art would be able to select a particular valve or valve structure that provides the function desired in the final product.

In addition to withdrawing air through a valve passage, air can also be withdrawn through the primary bag opening prior to the interlocking strips being closed. One method for doing this is a suction nozzle that is placed into the partially closed bag whereby the bag is held tightly around the nozzle, for example through the assistance of clamps. Another method for withdrawing air through the primary opening of the bag is through the use of a vacuum sealing food storage device that utilizes a small vacuum chamber (e.g., as described in U.S. Pat. No. 4,941,310). In both cases, it is desirable to use a bag of the current invention that is textured on the inside surface of the bag but without adhesive at the top of the bag thereby allowing good air flow. The applied suction forces the two sides of the bags into intimate contact which are held together by the adhesive on the remaining portion of the bag. The two sides of the bag are held together thereby allowing excellent air evacuation from the bag and restricting air from reentering the bag. Also, other materials may be incorporated in one or more of the above-described embodiments, such as films formed of other polymer materials than those specifically mentioned herein, including the so-called cling-wrap materials, to facilitate closure of a storage bag from entry of air.

Figure 12:
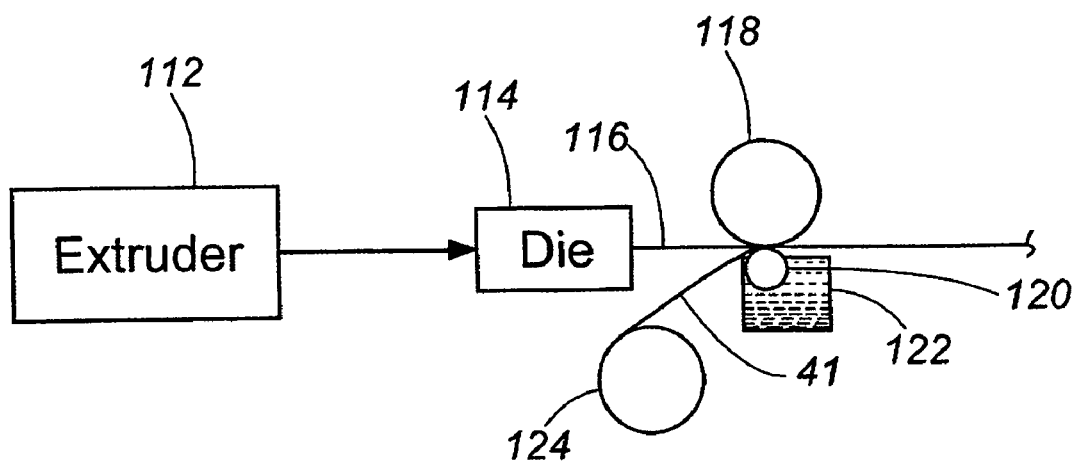
FIG. 12 is a diagrammatic view illustrating a process for forming a storage bag material for the present invention.

Referring to FIG. 12, a process for forming a storage bag material for the present invention is illustrated diagrammatically and includes an extruder 112 followed by a die 114 for forming a base material comprising a fluid (i.e., ranging in temperature from a molten temperature to the known glass transition temperature) film layer 116, such as a LDPE layer of the film material in a fluid state, prior to a chilling step. The fluid film layer 116 is fed to a nip between a chill roll 118 and a nip roll 120 located at a water bath 122. A layer of composite material, such as the embossed composite material 41, is fed from a material supply 124 into the nip between the chill roll 118 and the nip roll 120 with the adhesive side of the composite material 41 facing away from the fluid film 116. The fluid film 116 bonds to the composite material 41 as the two layers of material 116, 41 pass through the nip of the chill roll 118 and the nip roll 120 in order to form a double-layer sheet of material 126 which may be used to construct storage bags having a composite material inner layer. Attachment of the layer of composite material to the base material may be done by techniques known by those skilled in the art including thermal lamination, adhesive lamination, mechanical fastening such as embossing and the like. It is also contemplated that the base layer can be formed as a composite material with bags then being formed from the resulting composite material.

Figure 15:
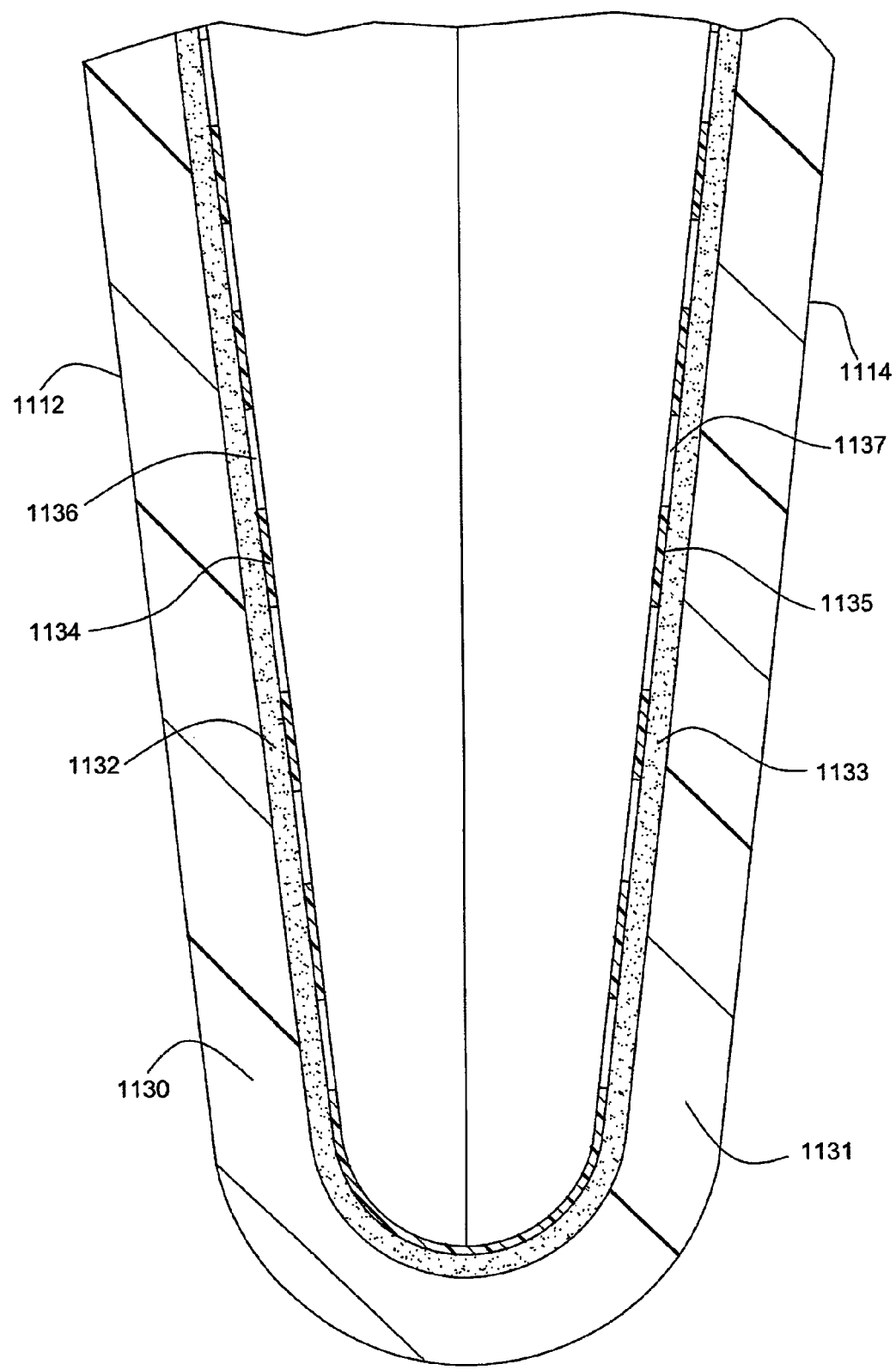
FIG. 15 is a fragmentary cross-sectional elevational view of the storage bag of FIGS. 13 and 14.

Referring to FIGS. 13-15, another embodiment of the storage bag is shown. The storage bag 1100 generally includes two opposing sidewalls 1112, 1114 that are attached together along a portion of a periphery of the sidewalls 1112, 1114, such as along longitudinal edge seams 1116, 1118 and along a laterally extending bottom edge 1120. An upper end of the bag includes a mouth 1122 for insertion of articles into the interior of the bag 1100. A reusable closure 1124 comprising complementary mating elements 1126, 1128 may be located on the interior of the sidewalls 1112, 1114 near the mouth 1122 for reclosably sealing the bag 1100.

Figure 16:
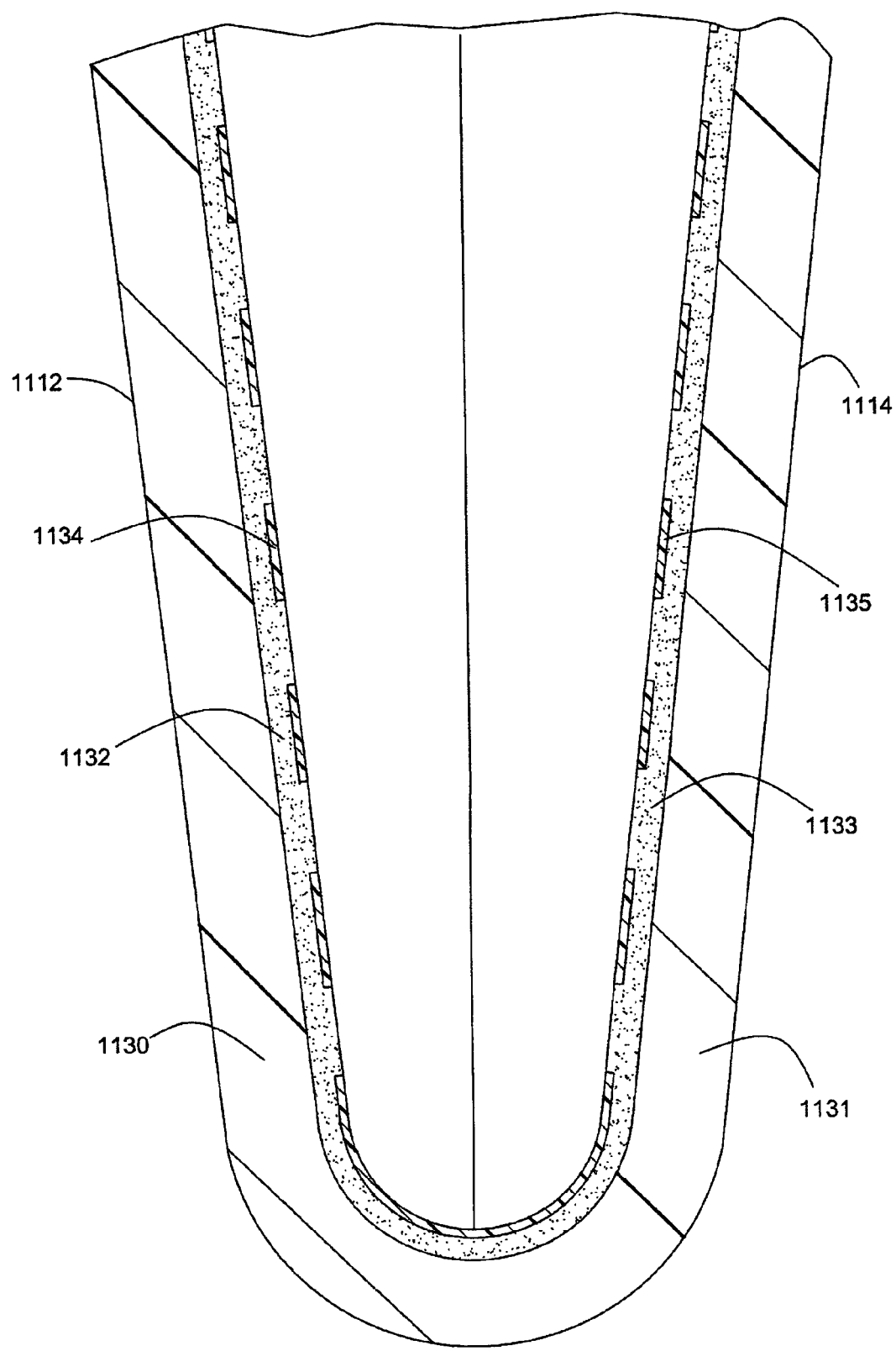
FIG. 16 is another fragmentary cross-sectional elevational view of the storage bag of FIGS. 13 and 14.
Figure 17:
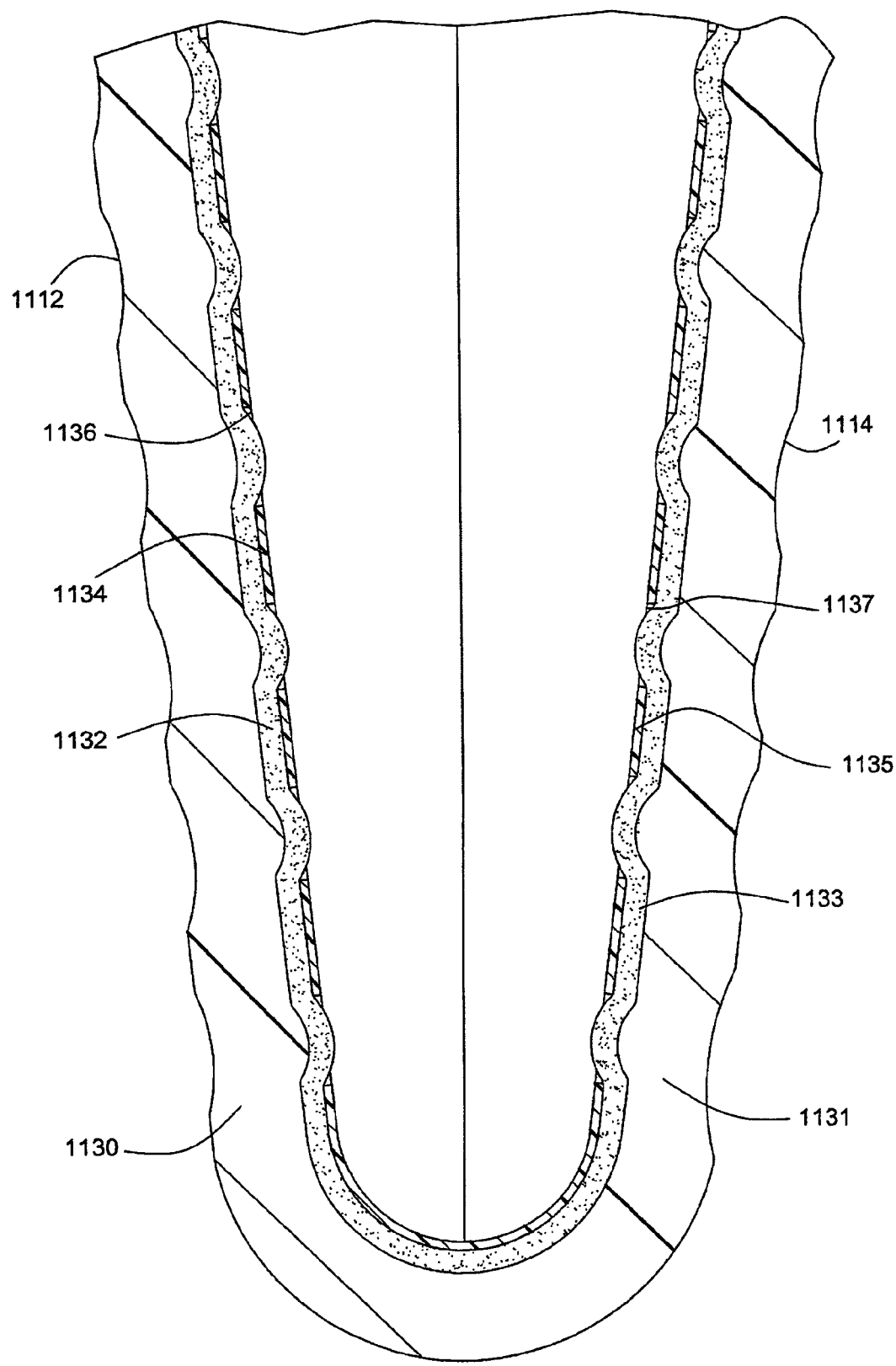
FIG. 17 is another fragmentary cross-sectional elevational view of the storage bag of FIGS. 13 and 14.
Figure 18:
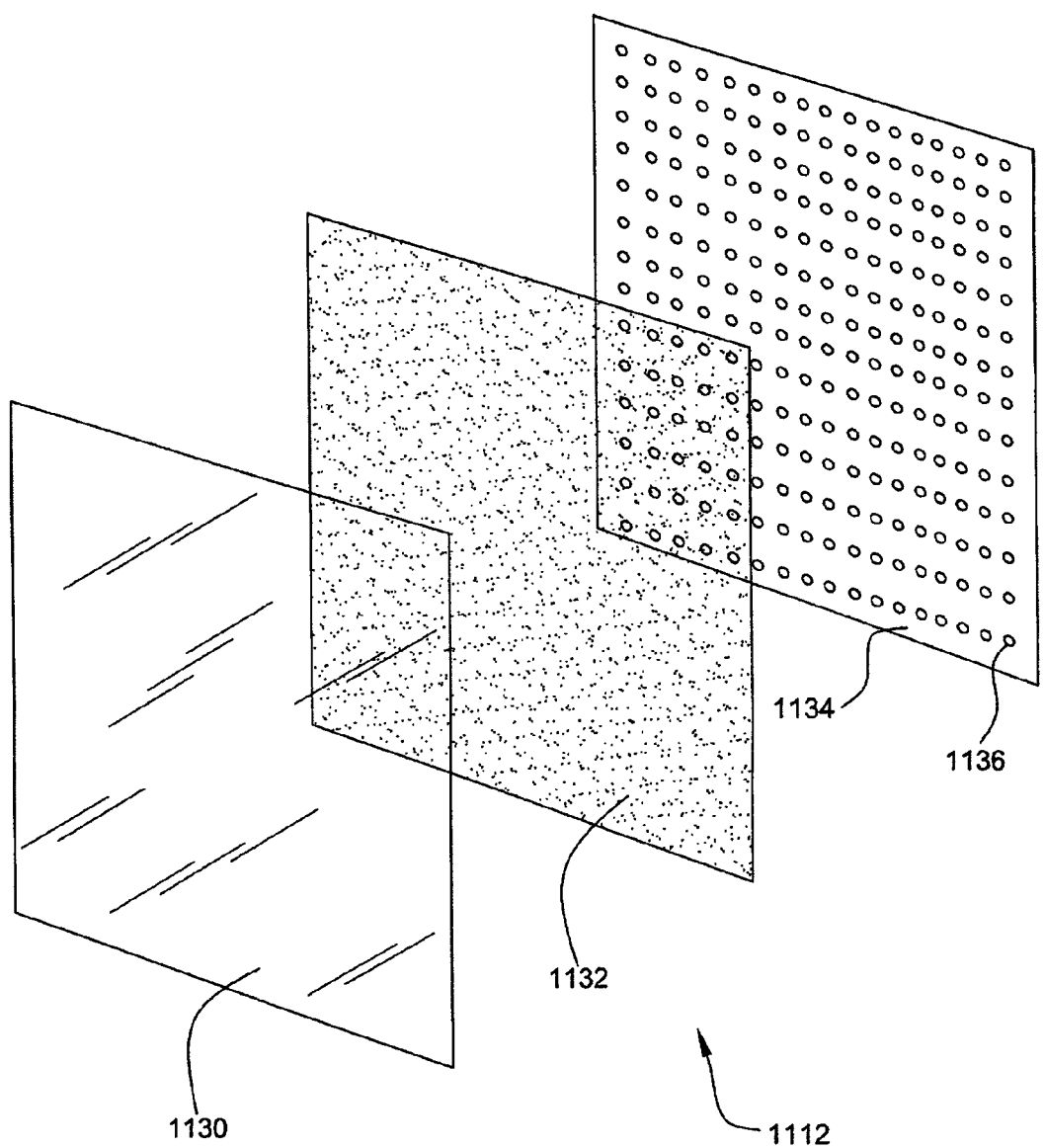
FIG. 18 is an exploded view of a sidewall for the storage bag of FIGS. 13 and 14.

As shown in FIGS. 14-18, each sidewall 1112, 1114 comprises an exterior layer 1130, 1131, a middle adhesive layer 1132, 1133, and a perforated layer 1134, 1135. The exterior layer 1130, 1131 provides strength for the bag 1100 to support items placed within the bag 1100 and helps restrict the passage of air into the bag 1100. The middle adhesive layer 1132, 1133 permits the opposing sidewalls 1112, 1114 of the bag 1100 to be attached to one another to seal the bag 1100 and conform the bag 1100 around an item contained therein. The perforated layer 1134, 1135 helps to keep the adhesive 1132, 1133 from making contact with the item contained within the bag 1100 and prevents the adhesive 1132, 1133 from unintentionally adhering to the opposing sidewall 1112, 1114. The perforated layer 1134, 1135 has a plurality of perforations 1136, 1137 that permit the adhesive 1132, 1133 to adhere the opposing sidewalls 1112, 1114 to one another when pressure is applied to the bag 1100 by allowing the adhesive 1132, 1133 to enter the perforations 1136, 1137 as shown in FIG. 16 and/or through the deformation of the exterior layer 1130, 1131 allowing the adhesive 1132, 1133 to make contact with the opposing sidewall 1112, 1114 of the bag as shown in FIG. 17.

The tack of the bag 1100 may be increased or decreased, for example, by altering the gauge of the perforated layer 1134, 1135, the size of the perforations 1136, 1137, and/or the pitch of the perforations 1136, 1137. Although the bag 1100 is shown with both sidewalls 1112, 1114 comprising an exterior film 1130 having an adhesive 1132 and a perforated layer 1134, the adhesive and perforated film may reside on only one sidewall 1112, 1114.

Figure 19:
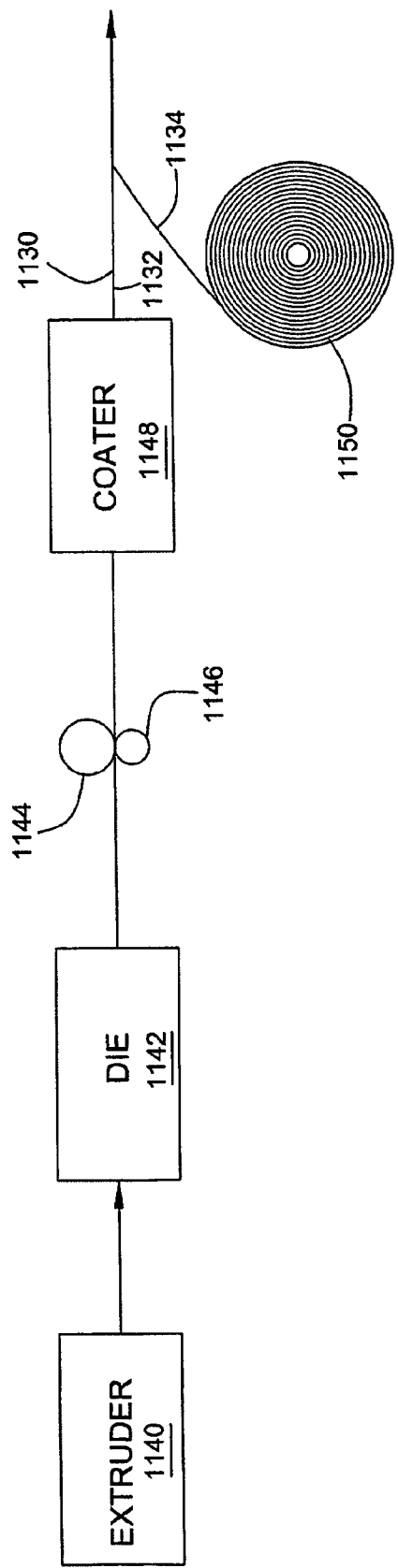
FIG. 19 is a diagram illustrating a process for forming the sidewall of FIG. 18.

The bag 1100 may be manufactured by any one of a plurality of manufacturing systems and processes. For example, turning to FIG. 19, the film for the exterior layer 1130 may be extruded by an extruder 1140 through a die 1142. Upon leaving the die 1142, the film moves through a casting roll 1144 and a pressure roll 1146 to control the thickness of the film. The film then passes through a coater 1148 that applies the adhesive layer 1132 to the film. Finally, a roll 1150 of perforated film 1134 is provided, and the perforated film 1134 is attached to the side of the exterior layer film 1130 having the adhesive 1132.

Figure 20:
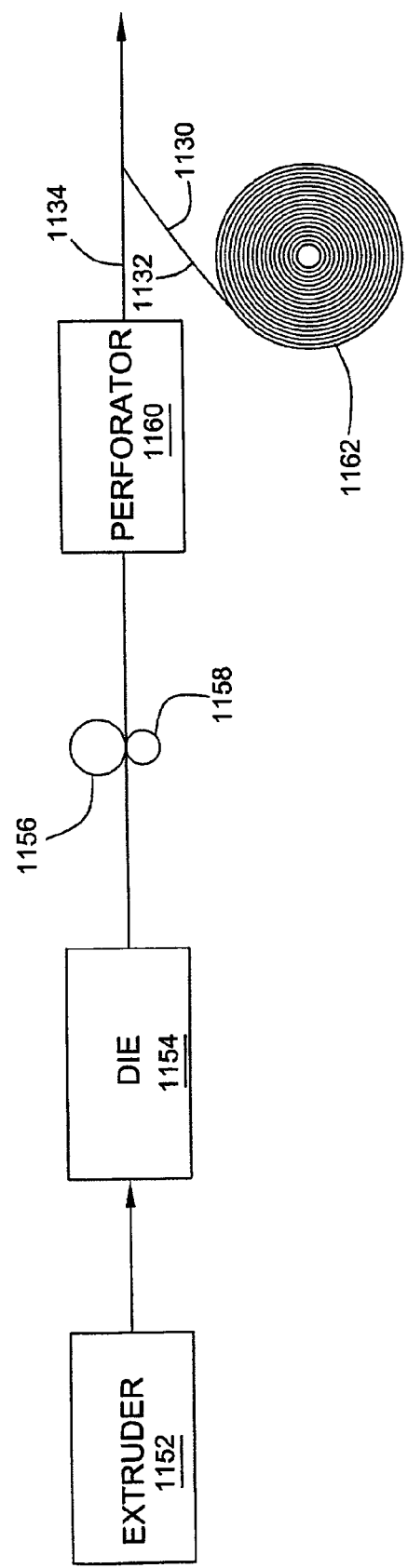
FIG. 20 is a diagram illustrating another process for forming the sidewall of FIG. 18.

The bag 1100 may also be manufactured as shown in FIG. 20. The film 1134 is extruded by an extruder 1152 through a die 1154. The film 1134 then moves through a casting roller 1156 and a pressure roller 1158 to control the thickness of the film 1134. The film then passes through a perforator 1160, which creates the plurality of perforations in the film. As the perforated layer film 1134 exits the perforator 1160, a roll 1162 of film (i.e., the exterior layer film 1130) coated with an adhesive layer 1132 is provided and attached to the perforated layer film 1134.

Figure 21:
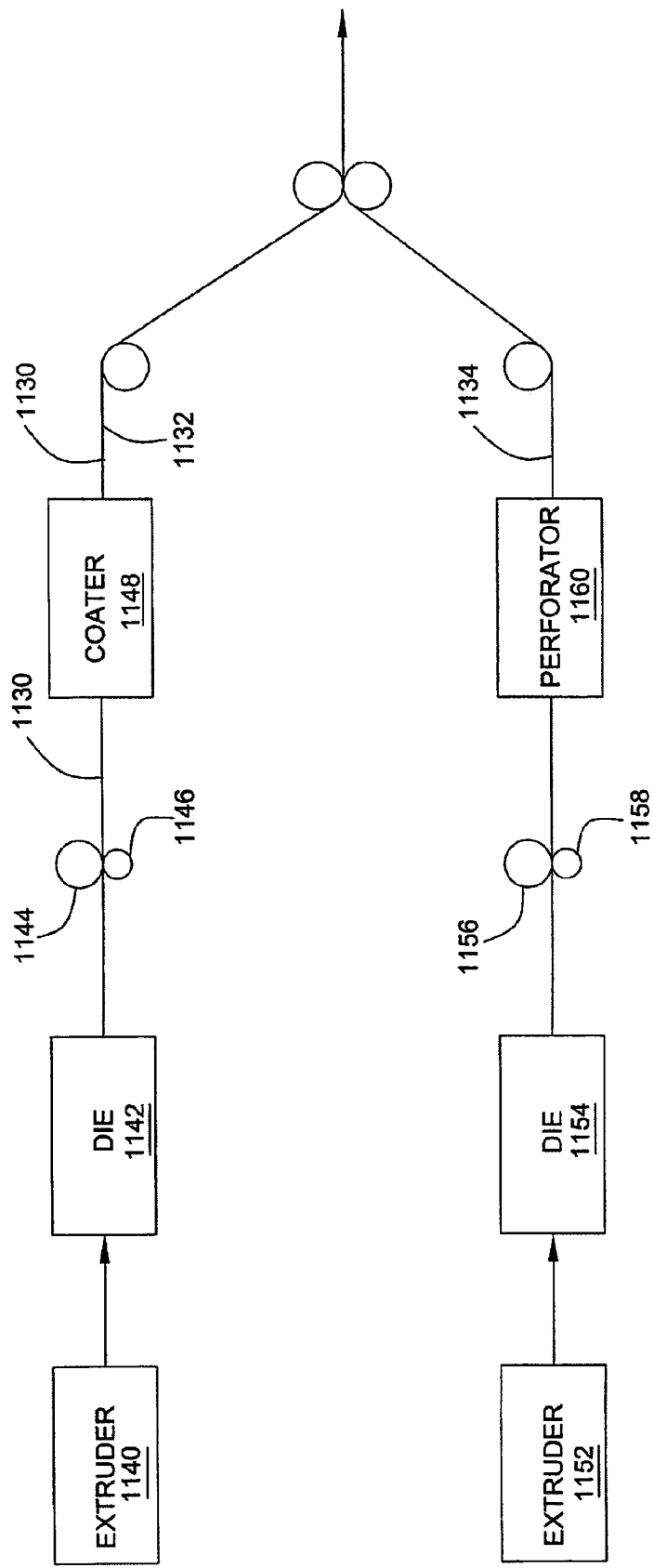
FIG. 21 is a diagram illustrating another process for forming the sidewall of FIG. 18.

In another embodiment shown in FIG. 21, the two processes described above may be operated simultaneously. As the exterior layer film 1130 exits the coater 1148 that applies the adhesive 1132, it is combined with the perforated layer film 1134 as the perforated layer film 1134 exits the perforator 1160. In yet another embodiment shown in FIG. 22, a roll 1150 of previously manufactured perforated film 1134 may be combined with a roll 1162 of previously manufactured exterior layer film 1130 coated with an adhesive 1132.

Once the process is complete, the combination exterior layer film 1130, adhesive 1132, and perforated layer film 1134 may be cut and formed into the bag 1100.

Turning to FIGS. 23, 24, and 25, another embodiment of a storage bag 1200 is shown. In this embodiment, an inner bag 1310 is disposed within an outer bag 1210. The outer bag sidewalls 1212, 1214 have exterior surfaces 1270, 1271 and interior surfaces 1272, 1273. The inner bag 1310 also comprises sidewalls 1312, 1314 having exterior surfaces 1370, 1371 and interior surfaces 1372, 1373. The inner bag sidewalls 1312, 1314 are attached to the interior surfaces 1272, 1273 of the outer bag sidewalls 1212, 1214. In this embodiment, the inner bag sidewalls 1312, 1314 comprise an exterior layer 1330, 1331, adhesive layer 1332, 1333, and a perforated layer 1334, 1335 with perforations 1336, 1337 similar to the previous embodiment described above. Any one or more of the outer bag sidewalls 1212, 1214 and/or inner bag sidewalls 1312, 1314 may have an adhesive layer and a perforated layer such that the sidewall may adhere to an opposing sidewall.

Turning to FIGS. 26 and 27, another embodiment of a storage bag 1400 is shown. The storage bag 1400 in this embodiment comprises outer sidewalls 1412, 1414 having interior surfaces 1472, 1473 and exterior surfaces 1470, 1471. The bag 1400 comprises a second layer or second set of sidewalls 1512, 1514 forming an inner bag 1510. The inner bag sidewalls 1512, 1514 also have interior surfaces 1572, 1573 and exterior surfaces 1570, 1571. The interior surfaces 1472, 1473 of the outer bag 1410 are attached to the exterior surfaces 1570, 1571 of the inner bag 1510. This may be accomplished, for example, by laminating the inner bag 1510 to the outer bag 1410. At least a portion of one or both of the interior surfaces 1572, 1573 of the inner bag sidewalls 1512, 1514 may be coated with an adhesive 1480 such that the opposing inner bag interior surfaces 1572, 1573 can be adhered to one another.

Figure 54:
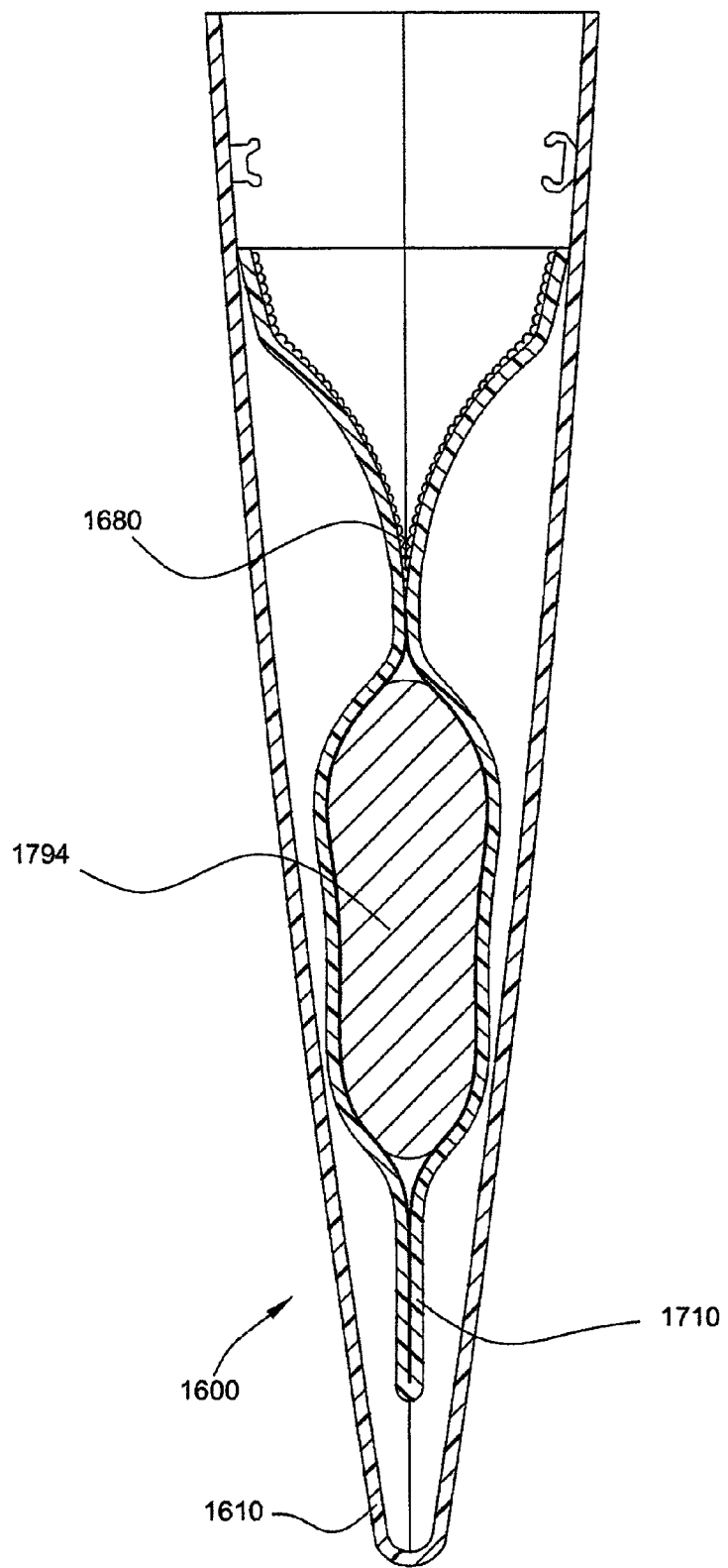
FIG. 54 is a cross-sectional elevational view of the storage bag of FIGS. 28 and 29 with an object disposed within the inner bag.

FIGS. 28 and 29 disclose another embodiment of a storage bag 1600. This embodiment is similarly constructed as previous embodiments. In this embodiment, the inner bag 1710 is only attached to the outer bag 1610 near upper edges 1748, 1750 of the inner bag 1710 such that the inner bag 1710 hangs loosely within the outer bag 1610 instead of being laminated or attached to substantial portions of the sidewalls 1612, 1614 of the outer bag 1610. As in the previous embodiment, an adhesive 1680 is disposed on the interior surfaces 1772, 1773 of the inner bag 1710. As shown in FIG. 54, a user may substantially expel any air in direct contact with the item 1794 by conforming the inner bag 1710 around the item 1794 and using the adhesive 1680 in the inner bag 1710 to secure the inner bag 1710 around the item 1794. The outer bag 1610 substantially retains its' shape because the inner bag 1710 hangs loosely within the outer bag 1610. FIGS. 30 and 31 disclose another embodiment of a storage bag 1800 that is similar to the previous embodiment, except that the adhesive 1880 is only disposed on the interior surface 1972 of one side of the inner bag 1910.

FIGS. 32 and 33 disclose another embodiment of a storage bag 2000. This embodiment may be similarly constructed as previous embodiments. In this embodiment, the inner bag 2110 is attached to only one sidewall 2012, 2014 of the outer bag 2010, thus creating a greater freedom of movement for the inner bag 2110 than certain other embodiments. This embodiment further permits the inner bag 2110 to be sealed independently from the outer bag 2010 and creates two storage compartments in the storage bag 2000 such that a user could place and maintain items separately within a single storage bag 2000. It may be desirable, for example, to have a single bag with more than a single storage compartment. For example, a user could maintain a snack in compartment 2185 and a sandwich in compartment 2085. Using the adhesive 2080, the storage compartment 2185 may be sealed to keep the items in storage compartment 2185 from intermingling with the items stored in compartment 2085. Although this embodiment is shown with adhesive 2080 on both sidewalls 2112, 2114 of the inner bag 2110, an adhesive 2080 may be disposed on only one sidewall 2112, 2114.

Figure 34:
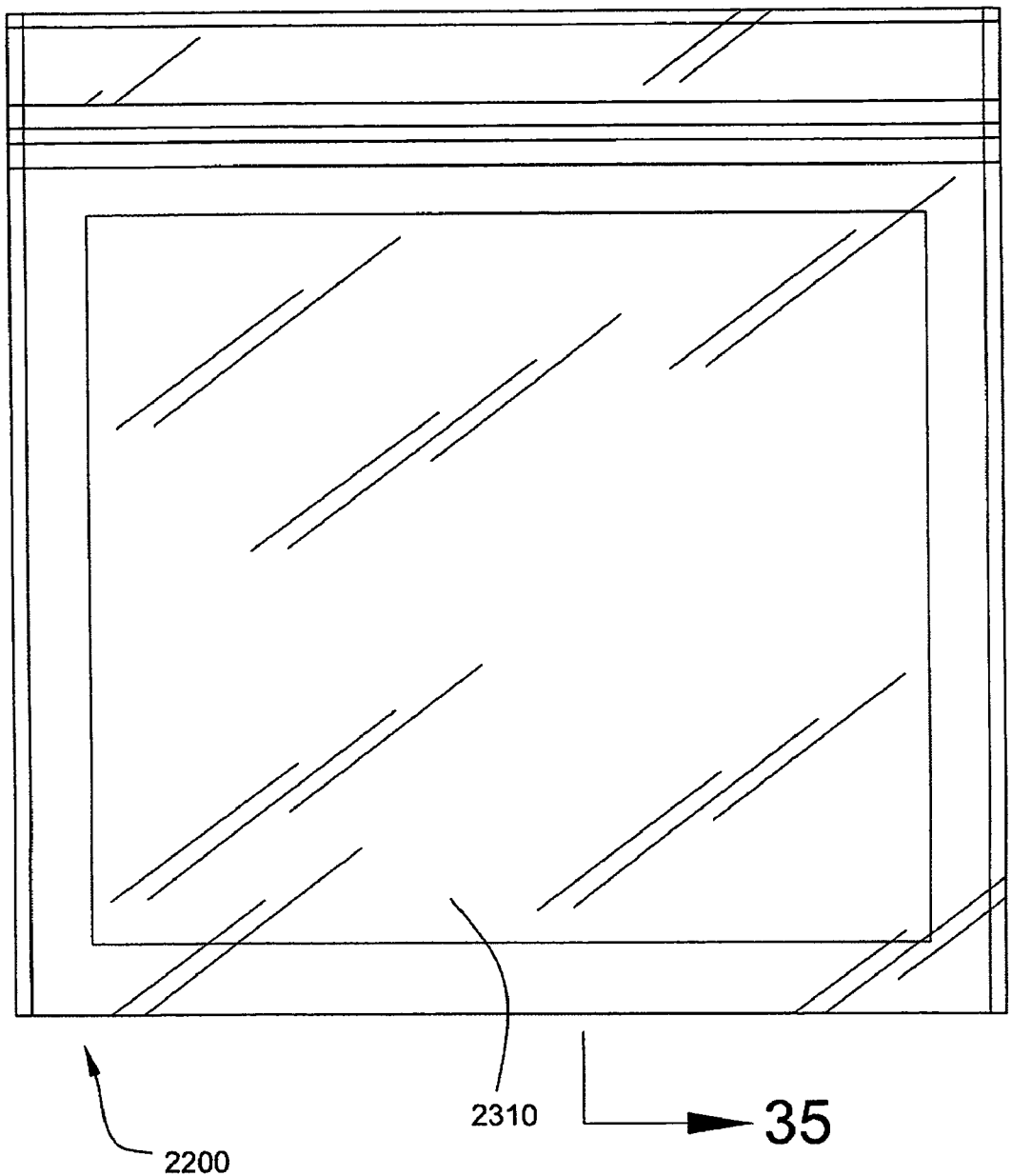
FIG. 34 is a front elevational view of another embodiment of a storage bag.
Figure 35:
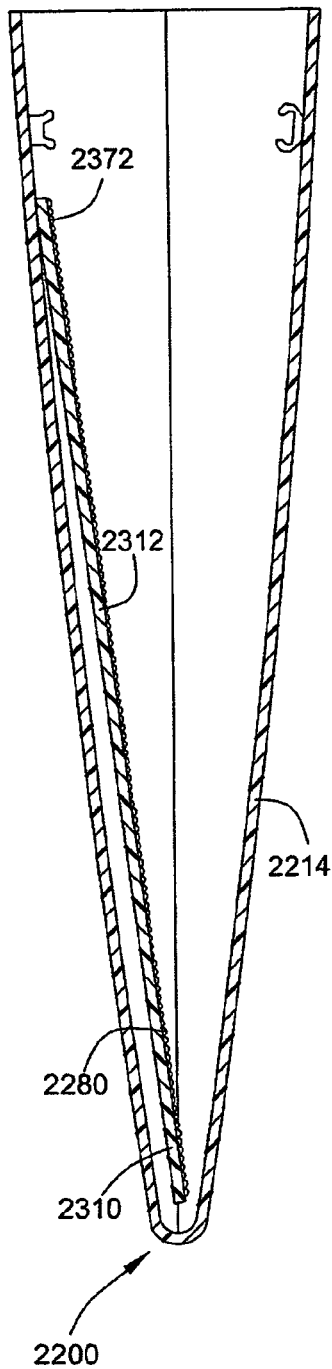
FIG. 35 is a cross-sectional elevational view taken along line 35-35 in FIG. 34.
Figure 36:
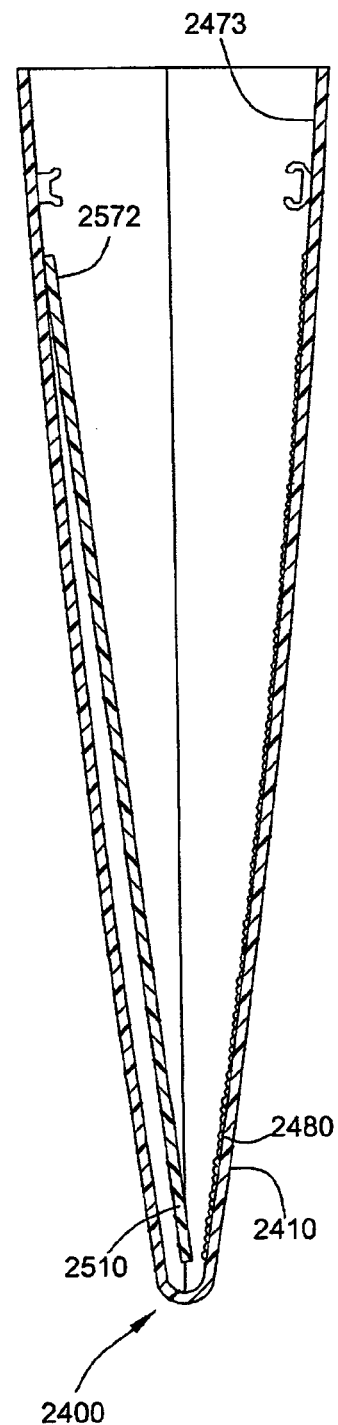
FIG. 36 is a cross-sectional elevational view of another embodiment of a storage bag.
Figure 37:
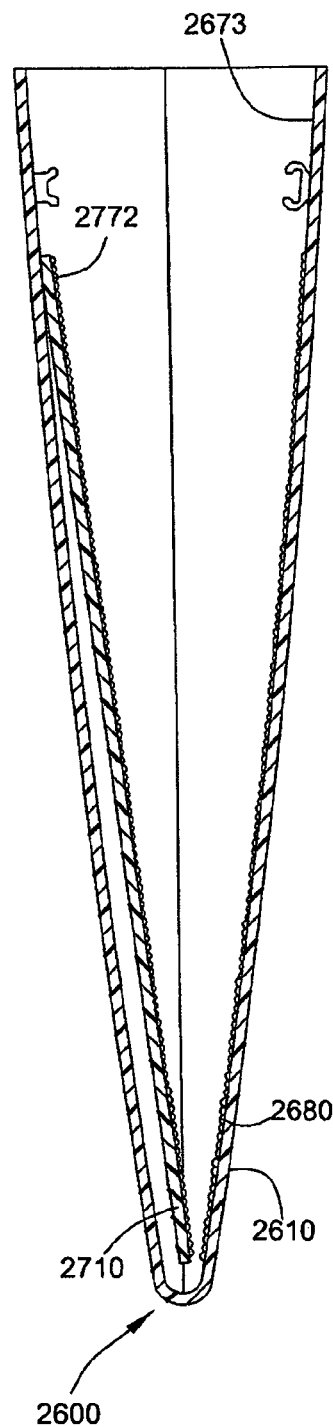
FIG. 37 is a cross-sectional elevational view of another embodiment of a storage bag.

FIGS. 34 and 35 disclose another embodiment of a storage bag 2200. This embodiment may be similarly constructed to previous embodiments. The inner bag 2310 in this embodiment has a single sidewall 2312. Similar to the previously disclosed embodiment, this embodiment permits a user to place items within the bag 2200 and maintain the items separately with items disposed on either side of the inner bag sidewall 2312. As shown in FIG. 35, an adhesive 2280 may be disposed on the inner surface 2372 of the inner bag 2310 such that the inner bag sidewall 2312 may be adhered to the opposing outer bag sidewall 2214 or a lower edge of the inner bag sidewall 2312 may be lifted and adhered to itself to essentially form a U-shape to contain items. FIG. 36 shows another example of a storage bag 2400, which is similar to the embodiment shown in FIGS. 34-35. As shown, an adhesive 2480 may be disposed on an inner surface 2473 of the outer bag 2410 opposing the inner surface 2572 of the inner bag 2510. FIG. 37 shows yet another example of a storage bag 2600, which is similar to the embodiments shown in FIGS. 34-36. In this embodiment, an adhesive 2680 may be disposed on both the inner surface 2772 of the inner bag 2710 and an inner surface 2673 of the outer bag 2610. Adhesive may be disposed on any one or more of the interior or exterior surfaces of the inner bag sidewall or the interior surfaces of the outer bag sidewalls.

FIGS. 38 and 39 disclose another embodiment of a storage bag 2800. This embodiment is similarly constructed as previously disclosed embodiments. In this embodiment, the inner bag 2910 has a line of perforations 2890, 2891 on the opposing sidewalls 2912, 2914 of the inner bag 2910. The line of perforations 2890, 2891 are substantially parallel with the upper edge 2948, 2950 of the inner bag sidewalls 2912, 2914. The line of perforations 2890, 2891 permit the inner bag 2910 to be torn out along the line of perforations 2890, 2891 and removed from the outer bag 2810. Alternately, the inner bag 2910 may be torn along a single perforated line 2891 such that it is similar to the embodiment disclosed in FIGS. 32 and 33. It may be desirable to remove the inner bag 2910, for example, if the inner bag 2910 has become soiled by storing food or other items inside. The user may remove and discard the inner bag 2910 and still use the unspoiled outer bag 2810 for storage. Thus, the storage bag 2800 may be used at least twice without cleaning the inner bag 2910 or outer bag 2810 even if the items stored in the storage bag 2800 are relatively messy.

As another example, the inner bag 2910 may be torn out to wrap the inner bag 2910 around an item. The item wrapped in the inner bag 2910 may then be placed within the outer bag to provide two layers of protection for the item. This enables a user to provide a first layer of protection for the item being stored that conforms to the shape of the item and excludes nearly all of the air between the item and the inner bag 2910. This enhances protection and extends the preservation of the item.

The line of tear perforations may be disposed at any suitable position on the inner bag or the outer bag.

FIGS. 40 and 41 disclose another embodiment of a storage bag 3000. This embodiment is similar to the previously disclosed embodiment of FIGS. 38 and 39 having perforated lines 3090, 3091, but with the addition of an adhesive 3080 disposed on the interior surfaces 3172, 3173 of the inner bag 3110. The adhesive 3080 may be disposed on one or both inner surfaces 3172, 3173 of the inner bag 3110. As in the previous embodiment, this embodiment permits a user to remove the inner bag 3110, wrap an item to be stored within the inner bag 3110, and then place the wrapped item within the outer bag 3010 as described above.

Figure 42:
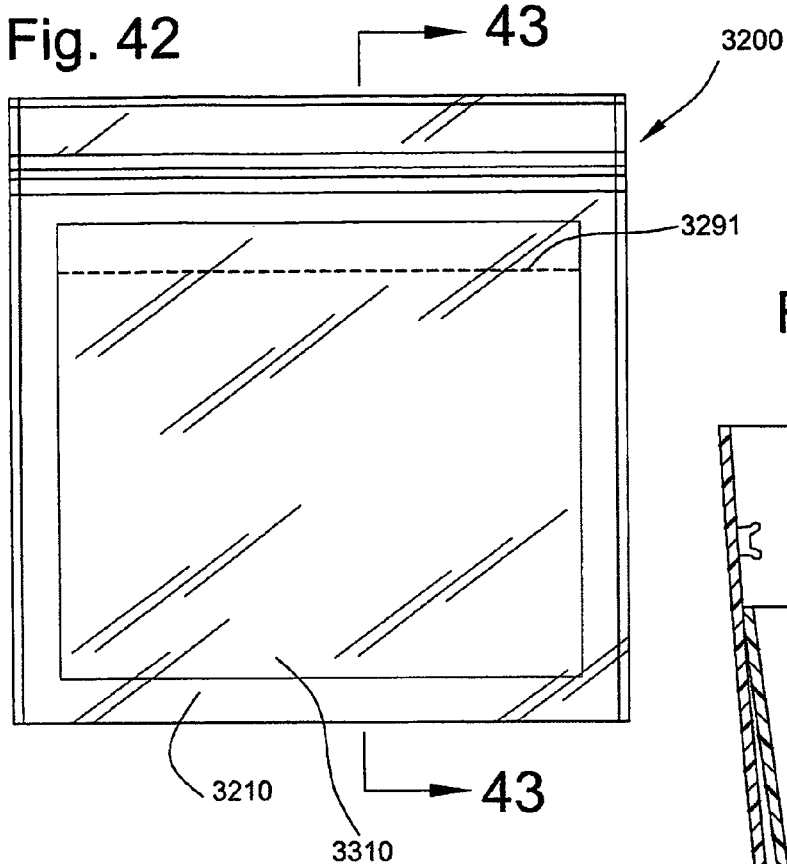
FIG. 42 is a front elevational view of another embodiment of a storage bag.
Figure 43:
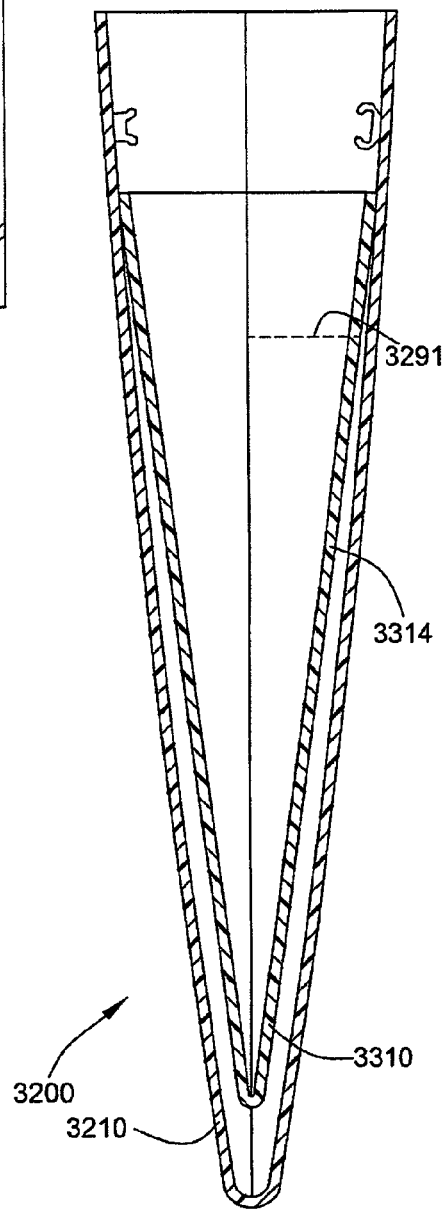
FIG. 43 is a cross-sectional elevational view taken along line 43-43 of the storage bag of FIG. 42.
Figure 44:
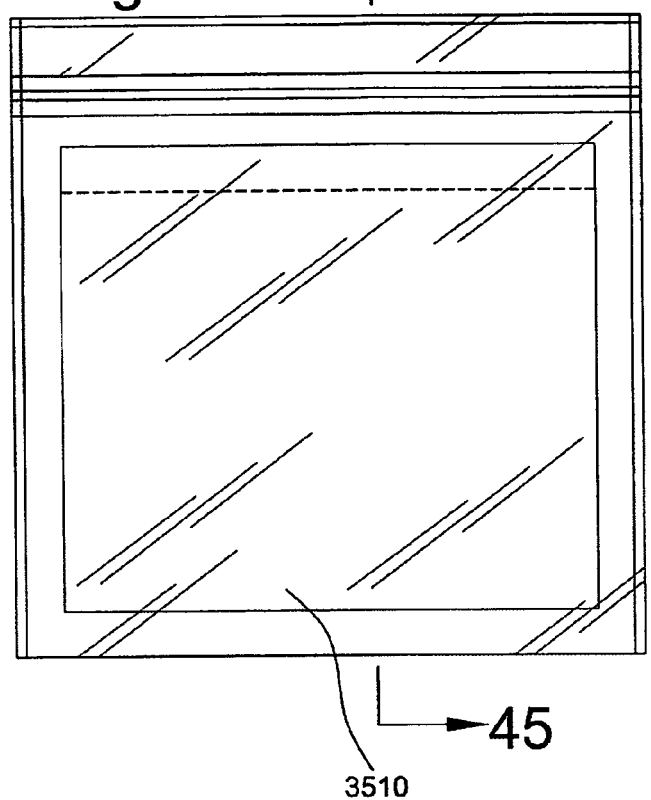
FIG. 44 is a front elevational view of another embodiment of a storage bag.
Figure 45:
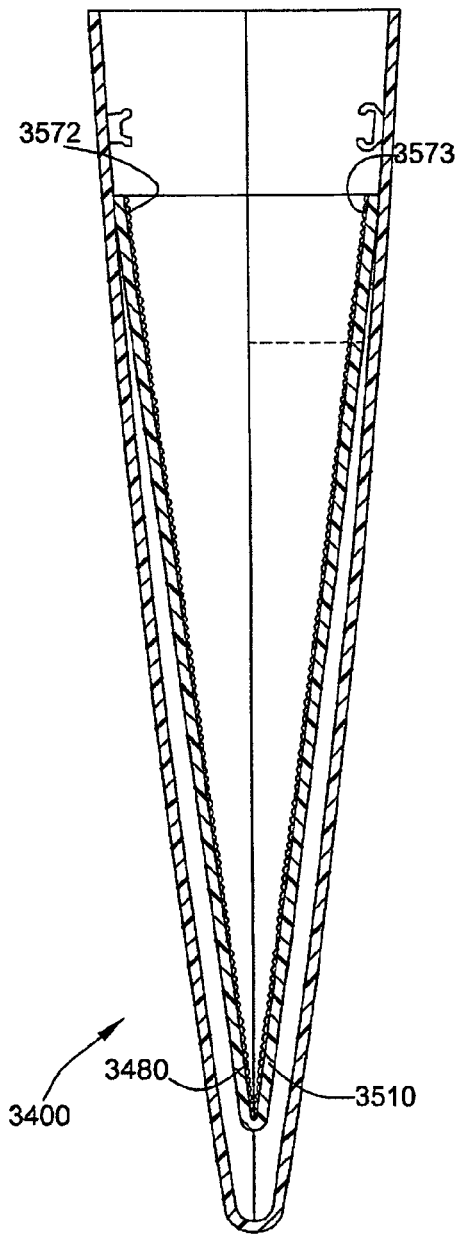
FIG. 45 is a cross-sectional elevational view taken along line 45-45 of the storage bag of FIG. 44.

FIGS. 42 and 43 disclose another embodiment of a storage bag 3200. This embodiment is similar to the embodiments disclosed in FIGS. 38-41, although the line of perforations 3291 is made on only one sidewall 3314 of the inner bag 3310. This enables a user to separate a sidewall 3314 of the inner bag 3310 from the outer bag 3210 such that a user can create a bag 3200 similar to the embodiment shown in FIGS. 32 and 33. An embodiment of a storage bag 3400 similar to the embodiment in FIGS. 42 and 43 is disclosed in FIGS. 44 and 45, with the addition of adhesive 3480 on one or both inner surfaces 3572, 3573 of the inner bag 3510.

Figure 46:
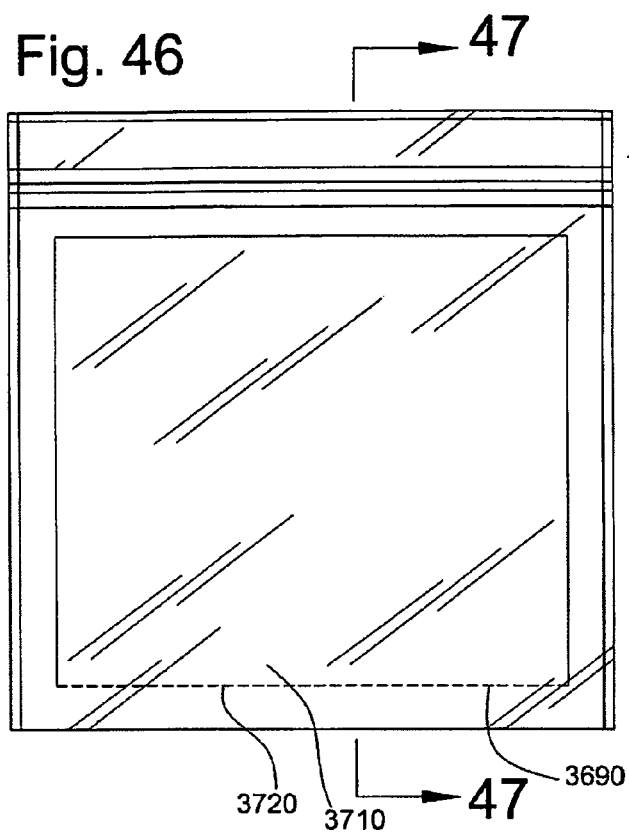
FIG. 46 is a front elevational view of another embodiment of a storage bag.
Figure 47:
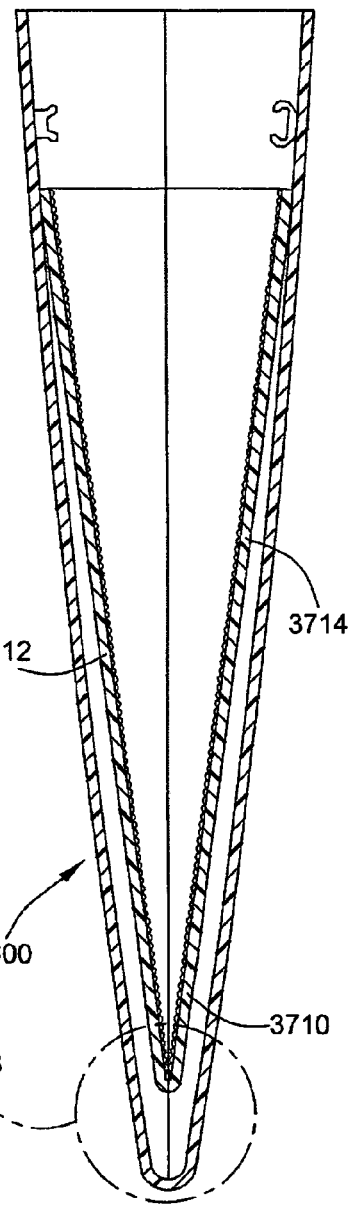
FIG. 47 is a cross-sectional elevational view taken along line 47-47 of the storage bag of FIG. 46.
Figure 48:
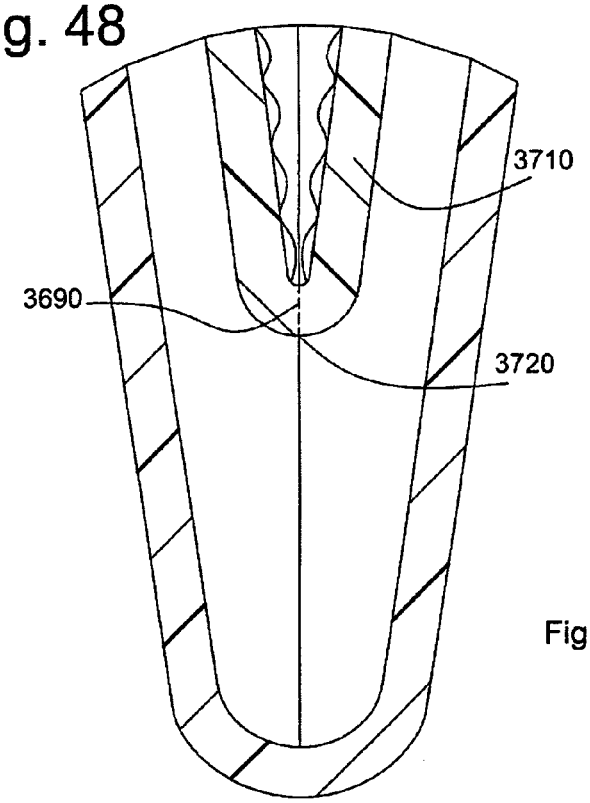
FIG. 48 is a fragmentary cross-sectional elevational view of the storage bag of FIGS. 46 and 47.

The line(s) of tear perforations may be disposed at alternate positions such as is shown in FIGS. 46-48. This embodiment is similarly constructed as previous embodiments. The line of perforations 3690 in this embodiment of a storage bag 3600 is disposed near the bottom 3720 of the inner bag 3710 such that the sidewalls 3712, 3714 of the inner bag 3710 may be separated from one another. The inner bag may have a line of perforations permitting the inner bag to be torn at any one or more positions on the inner bag, including, but not limited to the locations shown in the above described embodiments.

Figure 49:
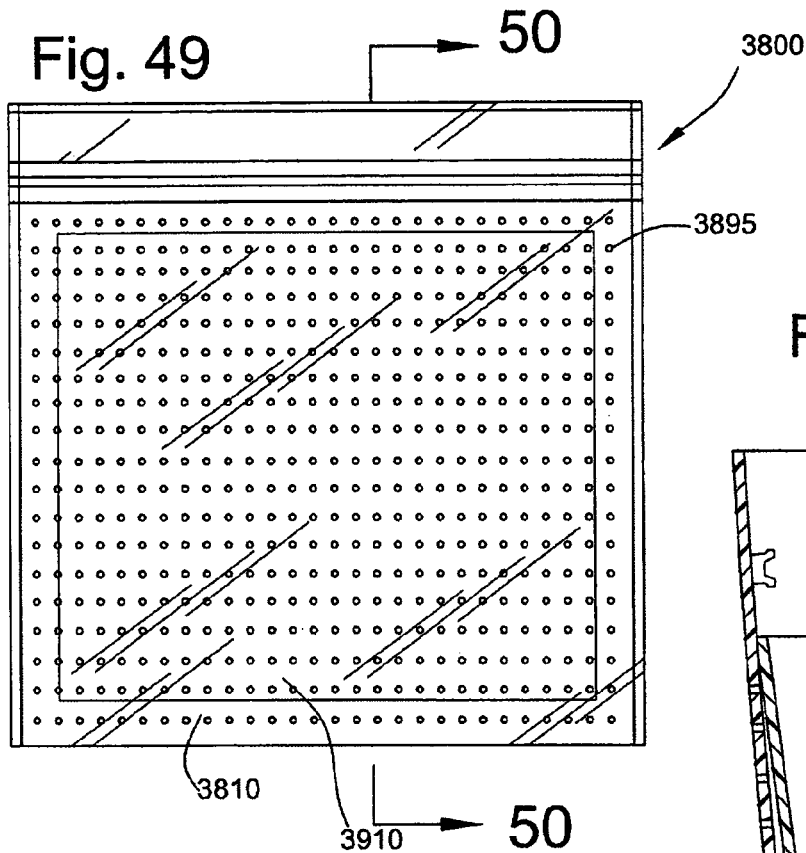
FIG. 49 is a front elevational view of another embodiment of a storage bag.
Figure 50:
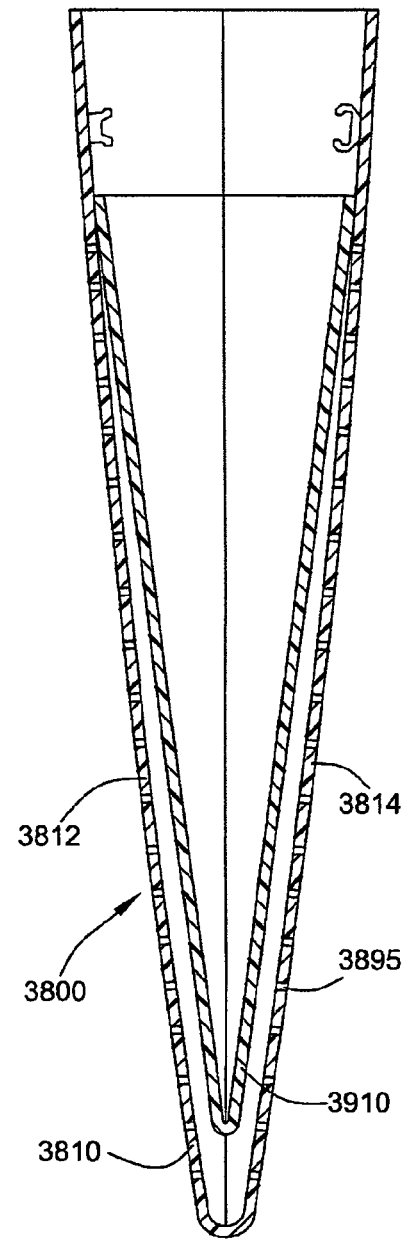
FIG. 50 is a cross-sectional elevational view taken along line 50-50 of the storage bag of FIG. 49.

FIGS. 49 and 50 disclose another embodiment of a storage bag 3800. This embodiment may be similarly constructed as the previous embodiments. In this embodiment, the outer bag 3810 has one or more perforations 3895 disposed on one or both sidewalls 3812, 3814 of the outer bag 3810 to permit the passage of air into and out of the outer bag 3810. These perforation(s) 3895 may be disposed at any suitable location on the outer bag 3810 and may be any suitable size such that air may pass more freely into and out of the outer bag 3810 than a bag having no perforations 3895 created thereon. These perforation(s) 3895 permit the venting of any air that has built up between the inner bag 3910 and outer bag 3810. These perforation(s) 3895 also help to conform the inner bag 3910 around an item because as pressure is applied to the bag 3800, any air between the inner bag 3910 and outer bag 3810 is able to escape so that the inner bag 3910 can more easily be manipulated around an item.

Figure 51:
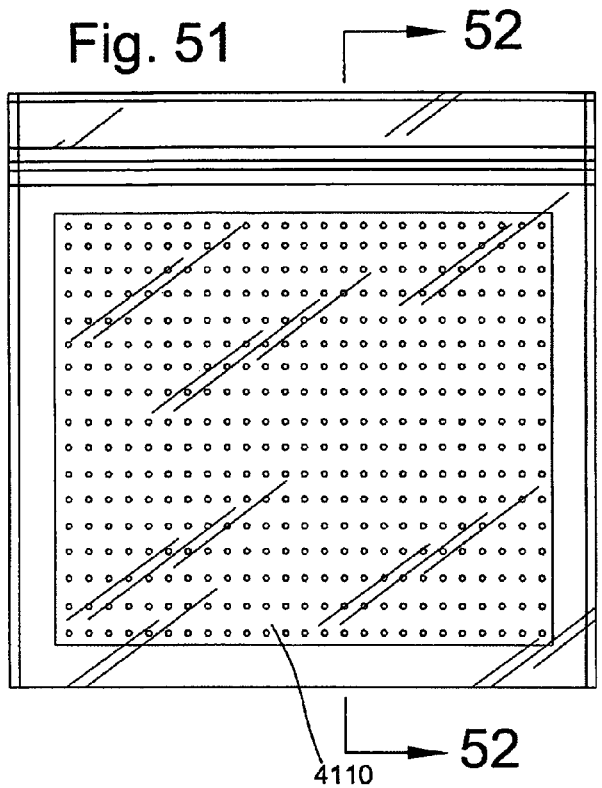
FIG. 51 is a front elevational view of another embodiment of a storage bag.
Figure 52:
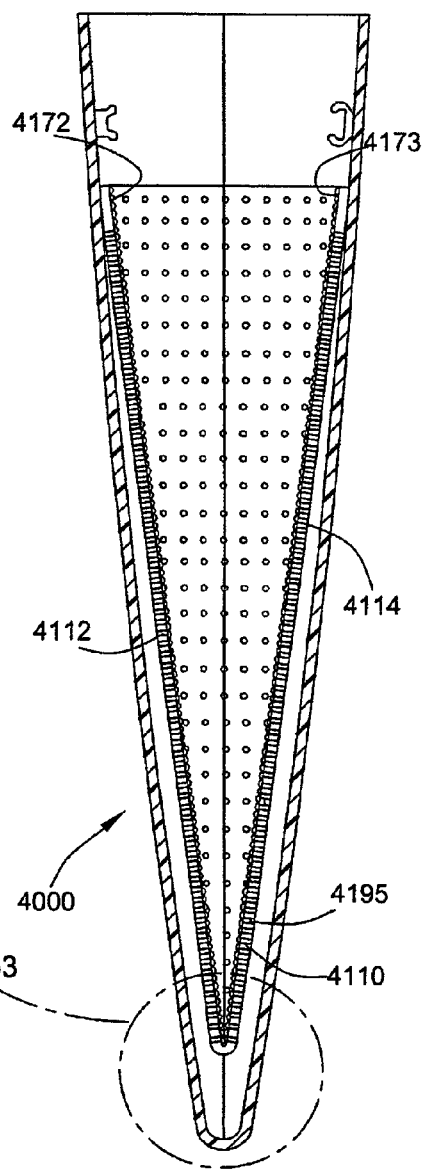
FIG. 52 is a cross-sectional elevational view taken along line 52-52 of the storage bag of FIG. 51.
Figure 53:
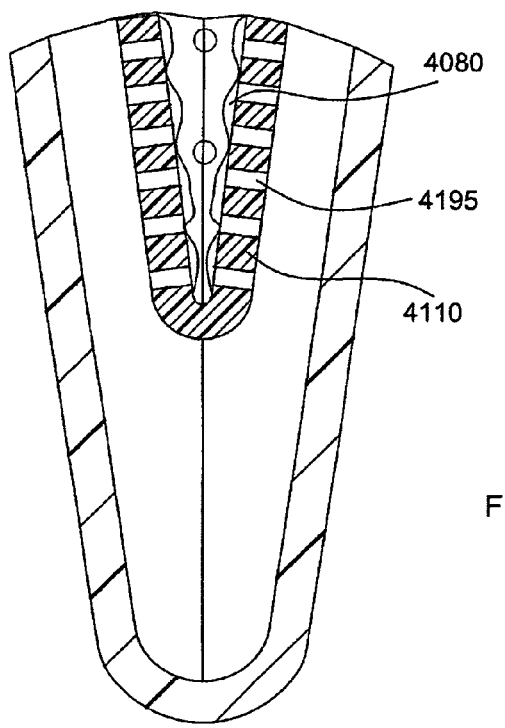
FIG. 53 is a fragmentary cross-sectional elevational view of the storage bag of FIGS. 51 and 52.

FIGS. 51-53 disclose another embodiment of a storage bag 4000. This embodiment is similarly constructed as previous embodiments. In this embodiment, the inner bag 4110 has one or more perforations 4195 disposed on one or both sidewalls 4112, 4114 of the inner bag 4110, and an adhesive 4080 is disposed on one or both sides of the interior surfaces 4172, 4173 of the inner bag 4110. These perforation(s) 4195 may be disposed at any suitable location on the inner bag 4110 and may be any suitable size such that air may pass more freely into and out of the inner bag 4110 than an inner bag 4110 having no perforations 4195 created thereon.

In any of the embodiments of the invention having an inner bag with opposing sidewalls, the inner bag sidewalls may be connected along any one or more edges of the inner bag. For example, the inner bag sidewalls may be connected to one another near the respective bottom edge of the inner bag, but not at the side edges of the inner bag. As another example, the inner bag sidewalls may be connected to one another at the bottom edge and along one or both of the side edges. Thus, the inner bag would be similar to the outer bag and is able to enclose contents along three edges with an opening near the upper edges of the inner bag.

In any of the embodiments described above, any inner and/or outer bag seams or sidewall connections may be formed by sonic welding, heat sealing, an adhesive or other conventional attachment means along the edges of the material forming the sidewalls, and the bottom edge(s) may be defined by an edge seam as described above or a fold in the material forming the sidewalls.

The closure in any of the embodiments described above may comprise an interlocking seal type closure, and may or may not include a slider (such as the slider shown in FIG. 8) for manipulating opening and closing of the bag. In other embodiments, the closure may by an adhesive. Thus, the present invention is not limited to the illustrated reusable closure, and examples of reusable closures that may be employed, and information on their manufacture, is described in U.S. Pat. Nos. 4,186,786; 4,285,105; 4,363,345; 4,561,109; 5,804,265 and 5,851,070. It will be appreciated that any suitable closure may be used.

Any one or more of the features in the embodiments described above may be utilized in a single storage bag. Furthermore, it will be understood that for those embodiments having an inner bag, the inner bag may be any suitable shape and/or size such that the inner bag may be disposed within the outer bag, including shapes and/or sizes that are not specifically illustrated in the figures for a given embodiment.

In embodiments having one or more perforations (such as on the inner bag, outer bag, a film disposed thereon, etc.) the perforations may be any suitable size, shape, and quantity.

Although the adhesive in many of the figures is shown on substantially the entire surface of a sidewall of the storage bag, it may alternately be disposed over only a portion of the respective sidewall. Further, in any of the embodiments described above, adhesive may be disposed on one or both of the outer bag sidewalls and/or one or both of the inner bag sidewalls. Additionally, the adhesive may be of any suitable type such that one sidewall is able to adhere to another sidewall. By way of example and not limitation, the bag may comprise a plurality of protrusions and valleys, such as may be formed by an embossing operation, where the valleys are at least partially filled with a pressure sensitive adhesive. The adhesive is held out of engagement with an adjacent surface by the protrusions until a sufficient pressure is applied to the side of the film opposite the adhesive side causing at least some of the protrusions to collapse and allow contact of the adhesive with the adjacent surface, resulting in adhesion between the composite material and the adjacent surface.

As described, the bag may utilize either raised protrusions, or raised land areas surrounding dimples, to prevent premature sticking of the adhesive to an adjacent surface. However, other structures or methods to control the tack of the adhesive and prevent the adhesive from attachment to an adjacent surface prior to the application of pressure may also be used. Examples of such materials may include, without limitation, release liners such as silicone coated paper or coatings, inks, varnish, particles (talc, calcium carbonate, starch, wax beads and the like), nonwovens, scrim and fibers which are mixed with or coated upon the adhesive. The adhesive and/or non-adhesive coatings can either be continuous or non-continuous (discrete). Solid, pressure activated adhesives can also be used including, without limitation, microencapsulated adhesives that are coated continuously or in discrete patterns onto a film. In the case of microencapsulated adhesives and the like, pressure is applied to rupture the surface of the microcapsules to bring the adhesive into contact with an adjacent surface. It will be appreciated, however, that other forms of adhesives and/or materials may be used.

In one embodiment, the adhesive may comprise a layer of a latex pressure sensitive adhesive about 0.001 inch (0.025 mm) thick. In other embodiments, the adhesive may comprise a layer of hot melt adhesive, specification no. Fuller HL-2115X made by H. B. Fuller Co. of Vadnais Heights, Minn., from about 0.0005 inch (0.013 mm) to about 0.002 inch (0.051 mm) thick. In further embodiments, the adhesive may comprise a layer of National Starch 3A-176A hot melt adhesive, available from the National Starch and Chemical company of Independence, Ky., from about 0.0005 inch (0.013 mm) to about 0.002 inch (0.051 mm) thick. Any adhesive can be used which suits the needs of the material application. Adhesives may be refastenable, releasable, permanent, or otherwise. In embodiments utilizing protrusions, described above, the size and spacing of protrusions may be selected to provide a continuous adhesive path surrounding protrusions so that air-tight seals may be made with a target surface.

The selected adhesive may provide the material with a wet seal adhesion peel force after activation of at least about 20 gf per inch of material. Alternatively, the wet seal adhesion peel force may be at least about 40 gf per inch. In another alternative, the wet seal adhesion peel force may be at least about 60 gf per inch. In still another alternative the wet seal adhesion peel force may be at least about 80 gf per inch.

Wet seal adhesion peel force is defined as the adhesion of a material to a surface wetted with water. Wet seal adhesion peel force is determined by the wet peel test set forth below. The National Starch 34-176A adhesive provided the material a wet peel adhesive of 100 gf per inch when tested. The adhesive may additionally provide a significant seal peel even after the seal has aged. The 34-176A adhesive provides a seal peel of at least about 80 gf per inch after the seal has been aged for 24 hours at 120 degrees Fahrenheit. Seal peel refers to the force requires to peel a portion of the material from a seal formed between two portions of the adhesive side of the material sealed together.

Wet Peel Test Procedure:

Three strips of material, each one inch in width are cut from a sheet of the material. An adhesive label is affixed to one end of each strip. The strips are stored with the adhesive side facing up and out of contact with any release liner.

A clean dry stainless steel plate, two inches by eight inches (5 by 20 cm) is weighed and the tare of the balance is set to the weight of the plate. Water is sprayed onto the plate and the plate is weighted again. The weight of the added water should be between 0.023 and 0.027 grams.

A clean glass plate, two inches by eight inches, (5 by 20 cm) should be used for the test. Water should be applied to the glass plate as it was applied to the steel plate. After the water is applied a strip of material should be placed upon the glass plate with the adhesive side facing the water. The strip should be smoothed and then rolled down using a ChemInstruments, RD3000, available from Cheminstruments Inc., of Fairfield, Ohio, applying ten pounds of force (44 N) to the strip at 24 inches (61 cm) per minute rolling the strip once in each direction along the length of the strip. The 90 degree peel test using the MTS tensile tester model 1 G, available from MTS System Corp., of Eden Prairie, Minn., performing the Peel04 test at a test speed of 12 inches (30.5 cm) per minute with a test length of 5 inches (12.5 cm) and a gage length of 3 inches (7.5 cm), should then be performed within 30 seconds of the roll down of the strip.

In any of the embodiments having both outer bag sidewalls and at least one inner bag sidewall, the inner bag sidewall(s) may be made of either the same or different material than the outer bag sidewalls and may have the same or different thickness than the outer sidewall. Further, the inner and outer bag sidewalls may be constructed of any suitable material and have any suitable thickness. Examples of materials that may be used for the inner and/or outer bag sidewalls include, without limitation, thermoplastic materials or a blend of thermoplastic materials. The films may be made by a conventional cast or blown film process. Useful thermoplastics include, without limitation, polyolefins such as high density polyethylene (HDPE), low density polyethylene (LDPE), linear low density polyethylene (LLDPE), and polypropylene (PP); thermoplastic elastomers such as styrenic block copolymers, polyolefin blends, elastomeric alloys, thermoplastic polyurethanes, thermoplastic copolyesters and thermoplastic polyamides; polymers and copolymers of polyvinyl chloride (PVC), polyvinylidene chloride (PVDC), saran polymers, ethylene vinyl acetate (EVA) copolymers, cellulose acetates, polyethylene terephthalate (PET), ionomer (Surlyn®), polystyrene, polycarbonates, styrene acrylonitrile, aromatic polyesters, linear polyesters, nylon, thermoplastic polyvinyl alcohols; foils, metalized films, wax paper or grease proof paper, nonwoven webs, fabrics, paper, ethylene copolymers, ethylene methyl acrylate (EMA) copolymer, polyethylene terephthalate glycol (PETG) copolymer, polyethylene-propylene copolymers, any suitable combinations thereof, and any other suitable materials.

It is contemplated that storage bags made in accordance with the teachings of the present invention can include any number of layers and that any number of layers can be used in any of the films used to make the bags by using processes known in the art including, without limitation, co-extrusion and lamination. For example, nylon or ethylene vinyl alcohol copolymer layers can be used to improve the flavor, aroma, and oxygen barrier properties of the bags. Further, one of skill in the art will realize that individual layers, or the components comprising an individual layer, utilized for the bag of the present invention can be selected to provide a specific functional or aesthetic requirement. In an exemplary, but non-limiting example, a UV-resistant layer can be provided within the structure of a layer comprising the bag of the present invention to prevent the photo-degradation of a product positioned within the bag.

For any two or more sidewalls laminated or otherwise adhered to one another, it will be appreciated that the sidewalls may be partially or fully laminated to one another. Similarly, for any sidewall comprising two or more layers laminated or otherwise adhered to one another, it will be appreciated that the layers may be partially or fully laminated to one another.

In accordance with an aspect of the invention, a storage bag is provided including a bag body comprising at least two opposing sidewalls including peripheral edges and the sidewalls being attached together along at least a portion of the peripheral edges. Each sidewall includes an outer layer and an inner layer with the inner layers defining opposing inner faces. At least one of the inner faces comprising a pressure sensitive composite material for bonding the opposing inner faces to each other.

In accordance with another aspect of the invention, a storage bag is provided including a bag body comprising at least two opposing sidewalls including peripheral edges and the sidewalls being attached together along at least a portion of the peripheral edges. Each of the sidewalls comprising an outer surface and an inner surface, the inner surfaces of the sidewalls being located in opposing facing relation to each other. At least one of the inner surfaces comprising a pressure sensitive composite material for bonding the at least two opposing sidewalls to each other.

In accordance with yet another aspect of the present invention, a process for forming a storage bag material comprises the steps of: providing a sheet of base film; providing a pressure sensitive composite material having an adhesive on one side thereof; moving the sheet of base film and the pressure sensitive composite material into overlaying engagement; and, attaching the pressure sensitive material to the sheet of base film.

The invention further provides a storage bag having a line of tear perforations disposed on the inner bag for tearing the inner bag along the line of tear perforations.

The invention further provides a storage bag wherein the line of tear perforations is disposed on at least one of the third and fourth sidewall.

The invention further provides a storage bag wherein the line of tear perforations is disposed at an intersection of the third and fourth sidewalls.

The invention further provides a storage bag wherein the third sidewall is laminated to the first interior surface of the first sidewall, and the fourth sidewall is laminated to the second interior surface of the second sidewall.

The invention further provides a storage bag wherein an adhesive is disposed on the fourth interior surface.

The invention further provides a storage bag having a film disposed over the adhesive on the third and fourth sidewalls. The film has a plurality of perforations.

The invention further provides a storage bag wherein the first, second, third, and fourth sidewalls have approximately the same width.

The invention further provides a storage bag wherein the third and fourth sidewalls are approximately the same size and are smaller than the first and second sidewalls in width.

The invention further provides a storage bag having one or more perforations in at least one of the third and fourth sidewalls.

The invention further provides a storage bag having a first and second sidewall. The first sidewall has a first interior surface and the second sidewall has a second interior surface. The first and second sidewalls are attached to one another along at least a portion of a periphery of the first and second sidewalls. An adhesive is disposed on a portion of at least one of the first and second interior surfaces. A film having a plurality of perforations is disposed over the adhesive such that the adhesive is disposed between the film and the at least one of the first and second interior surfaces.

The invention further provides a storage bag having an outer bag and an inner bag. The outer bag has a first sidewall and a second sidewall. The inner bag has a third sidewall and a fourth sidewall, and the inner bag is contained within the outer bag. The third sidewall is attached to a portion of the first sidewall, the fourth sidewall is attached to a portion of the second sidewall, and the third sidewall and fourth sidewall are attached to one another at an intersection of the third sidewall and fourth sidewall to define a bottom of the inner bag. A line of tear perforations is disposed on the inner bag for tearing the inner bag along the line of tear perforations. The line of tear perforations is disposed at a position other than at the intersection of the third sidewall and fourth sidewall.

The invention further provides a storage bag having a second line of tear perforations disposed on the inner bag.

The invention further provides a storage bag having an outer bag and an inner bag. The outer bag has a first sidewall and a second sidewall. The inner bag has a third sidewall and a fourth sidewall. The inner bag is contained within the outer bag. The third sidewall is attached to a portion of the first sidewall, and the fourth sidewall is attached to a portion of the second sidewall. A plurality of perforations is disposed on the outer bag.

The invention further provides a storage bag wherein the third sidewall and fourth sidewall are attached to one another at an intersection of the third sidewall and fourth sidewall to define a bottom of the inner bag.

The invention further provides a method of manufacturing a storage bag. A first film is extruded through a die. The first film is then coated with an adhesive. A second film having a plurality of perforations is provided and attached to the first film such that the adhesive is disposed between the first film and the second film.

The invention further provides that the second film is extruded through a die, and the plurality of perforations is created by passing the second film through a perforator.

The invention further provides another method of manufacturing a storage bag. The first film is extruded through a die. A plurality of perforations are created in the first film. A second film having an adhesive disposed on a surface of the second film is provided. The second film is attached to the first film such that the adhesive is disposed between the first film and the second film.

The invention further provides a method of manufacturing a storage bag. A first film is provided having a plurality of perforations. A second film having an adhesive disposed on a surface of the second film is also provided. The first film is attached to the second film such that the adhesive is disposed between the first film and the second film It will be appreciated that like reference numbers may refer to like features in the drawings. Furthermore, while the structure and function of various features in the drawings may only be specifically described with respect to a particular embodiment, other embodiments shown and/or described may have one or more of those same features. Therefore, it will be appreciated that like shown features in the drawings may represent the same or similar feature shown in the other drawings regardless of whether a reference number is assigned for that feature in a given drawing or whether that feature is described with respect to a given embodiment.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

All documents cited in the present application are incorporated herein by reference to the same extent as if each document were individually and specifically indicated to be incorporated by reference and were set forth in its entirety herein. The citation of any document is not to be construed as an admission that it is prior art with respect to the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of manufacturing a storage bag comprising:
    forming a first sidewall of the bag by extruding a first film through a die; coating a surface of the first film with an adhesive; providing a second film, the second film having a plurality of perforations; and attaching the second film to the first film such that the adhesive is disposed into the perforations of the second film;
    forming a second sidewall of the bag so that the first sidewall and the second sidewall are sealed along two longitudinal edges and a bottom edge to form a open mouth at the top edges of the first and second sidewalls and a bag interior;
    wherein the second film forms an interior surface of the bag and the adhesive in the perforations of the second film can be releasably attached to the interior surface of the second sidewall.

2. The method of claim 1 wherein the second film is extruded through a die, and the plurality of perforations are created by passing the second film through a perforator.

3. A method of manufacturing a storage bag comprising:
    providing a first film having a plurality of perforations;
    providing a second film having an adhesive disposed on a surface of the second film;
    attaching the first film to the second film such that the adhesive is disposed into the perforations of the first film to form a combination of a first perforated film layer, an adhesive layer, and a second film layer and having isolated adhesive protruding through the perforations of the first film;
    cutting and forming the combination of the first film layer, the adhesive layer, and the second film layer so that the combination forms one sidewall of a bag and is sealed to a second sidewall of the bag so that the isolated adhesive protruding through the perforation forms an interior surface of the bag and can be pressed onto the interior surface of the second sidewall of the bag.

4. The method of claim 3, wherein the step of forming the combination of layers into a bag includes attaching a reusable closure comprising complementary mating elements.

5. A method of manufacturing a storage bag comprising:
    attaching a first opposing sidewall and a second opposing sidewall along two longitudinal edge seams and a closed bottom edge and an open top edge to form a bag interior, wherein the first opposing sidewall has an exterior film, a middle layer of adhesive, and an interior perforated film so that adhesive protrudes into the perforations of the interior film, wherein after the attachment of the first sidewall and the second sidewall the adhesive in the perforations of the second film can be releasably attached to the interior surface of the second opposing sidewall.

6. The method of claim 5, wherein the step of forming the combination of layers into a bag includes attaching a reusable closure comprising complementary mating elements.

* * * * *